US012659806B2

(12) United States Patent
Abotabl et al.

(10) Patent No.: US 12,659,806 B2
(45) Date of Patent: Jun. 16, 2026

(54) WIRELESS COMMUNICATION USING MULTIPLE ACTIVE BANDWIDTH PARTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Alexandros Manolakos, Escondido, CA (US); Wanshi Chen, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

(21) Appl. No.: 18/004,031

(22) PCT Filed: Aug. 3, 2021

(86) PCT No.: PCT/US2021/044329
§ 371 (c)(1),
(2) Date: Dec. 30, 2022

(87) PCT Pub. No.: WO2022/035643
PCT Pub. Date: Feb. 17, 2022

(65) Prior Publication Data
US 2023/0262529 A1     Aug. 17, 2023

(30) Foreign Application Priority Data
Aug. 10, 2020     (GR) ............................... 20200100467

(51) Int. Cl.
| | | |
|---|---|---|
| H04W 28/20 | (2009.01) | |
| H04L 5/00 | (2006.01) | |
| H04W 72/0457 | (2023.01) | |

(52) U.S. Cl.
CPC ........... *H04W 28/20* (2013.01); *H04L 5/0096* (2013.01); *H04W 72/0457* (2023.01)

(58) Field of Classification Search
None
See application file for complete search history.

(56) References Cited

U.S. PATENT DOCUMENTS

| | | | |
|---|---|---|---|
| 2019/0199592 A1* | 6/2019 | Lin ........................ | H04W 72/23 |
| 2019/0253531 A1 | 8/2019 | Basu Mallick et al. | |

(Continued)

FOREIGN PATENT DOCUMENTS

WO     2019084570 A1     5/2019

OTHER PUBLICATIONS

Huawei, et al., "On Bandwidth Adaptation", 3GPP Draft, 3GPP TSG-RAN WG1 NR Ad-Hoc Meeting, R1-1711424, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 30, 2017 (Jun. 30, 2017), XP051300612, 5 Pages, Proposal 5, Section 3, Section 1-4.

(Continued)

*Primary Examiner* — Benjamin Lamont
(74) *Attorney, Agent, or Firm* — Loza & Loza, LLP

(57) ABSTRACT

Aspects relate to wireless communication using multiple active bandwidth parts (BWPs). For example, a base station may configure a user equipment (UE) with two or more active BWPs. The UE may then use one or more of the active BWPS at a time. For example, the UE may use multiple active BWPs for full duplex communication. Alter- (Continued)

natively, or in addition, the UE may switch between active BWPs under various configurations, based on UE capabilities.

16 Claims, 22 Drawing Sheets

(56) References Cited

U.S. PATENT DOCUMENTS

| | | | | |
|---|---|---|---|---|
| 2019/0357300 A1 * | 11/2019 | Zhou | ..................... | H04L 5/0094 |
| 2021/0167930 A1 * | 6/2021 | Jeon | ..................... | H04B 7/0626 |
| 2021/0184824 A1 * | 6/2021 | Kwak | ................... | H04L 5/0094 |
| 2022/0007365 A1 * | 1/2022 | Jung | ..................... | H04W 24/10 |
| 2022/0061054 A1 * | 2/2022 | Cui | ................... | H04W 72/0453 |

OTHER PUBLICATIONS

International Search Report and Written Opinion—PCT/US2021/044329—ISA/EPO—Nov. 24, 2021.

\* cited by examiner

_1200_

BS ⌐1202

UE ⌐1204

Optional main/secondary active BWP indication
↳1206

Select active BWP for communication ⌐1208

Optional physical channel/signal monitoring configuration
↳1210

Select active BWP for physical channel/signal monitoring ⌐1212

Optional prioritized signaling configuration
↳1214

Select active BWP for prioritized signaling monitoring ⌐1216

1400

Start

Receive bandwidth part (BWP) configuration information from a base station, the BWP configuration information specifying a first active BWP for the UE and a second active BWP for the UE    1402

Select the first active BWP    1404

Communicate with the base station using the first active BWP    1406

End

1500

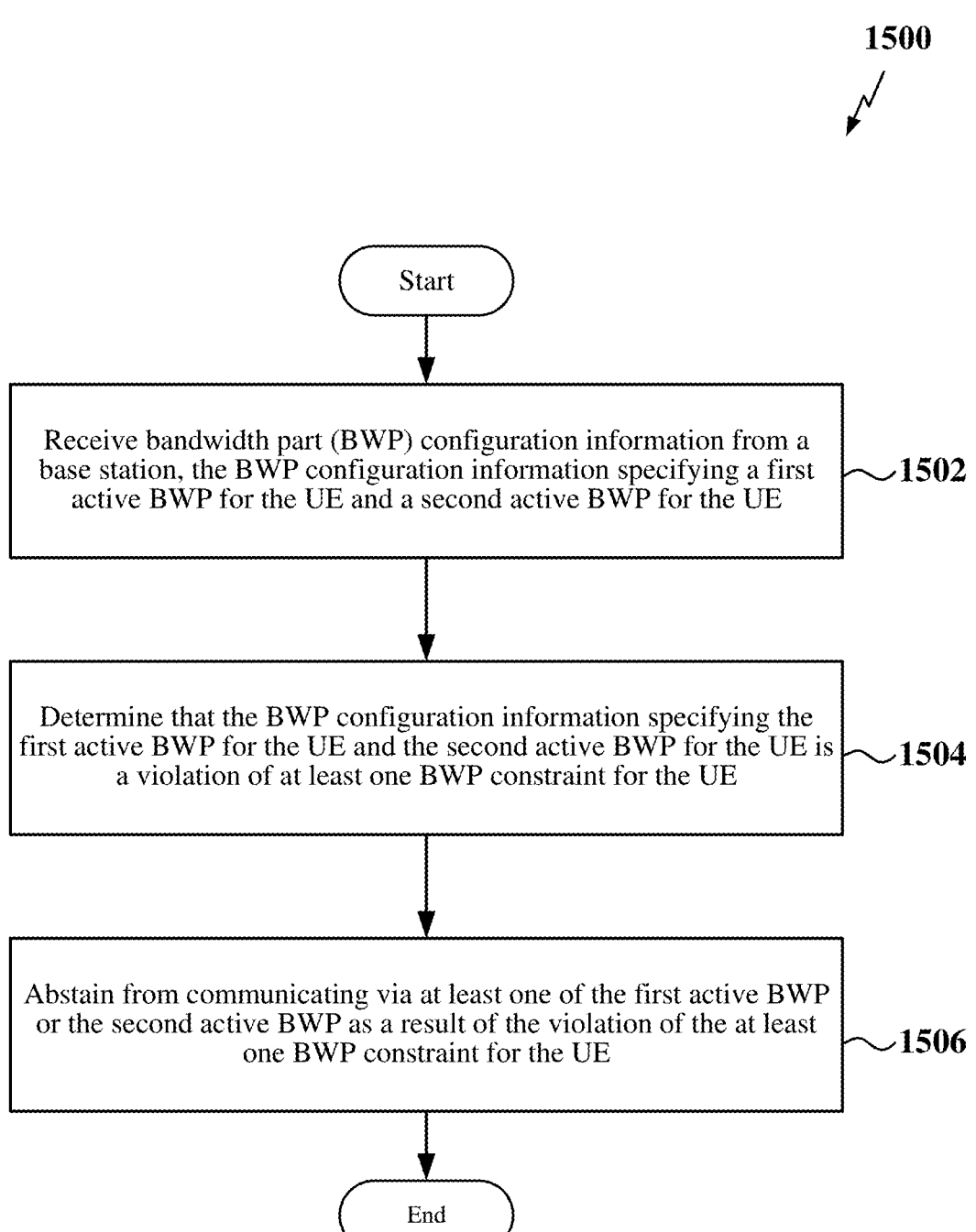

Start

Receive bandwidth part (BWP) configuration information from a base station, the BWP configuration information specifying a first active BWP for the UE and a second active BWP for the UE          ∿1502

Determine that the BWP configuration information specifying the first active BWP for the UE and the second active BWP for the UE is a violation of at least one BWP constraint for the UE          ∿1504

Abstain from communicating via at least one of the first active BWP or the second active BWP as a result of the violation of the at least one BWP constraint for the UE          ∿1506

End

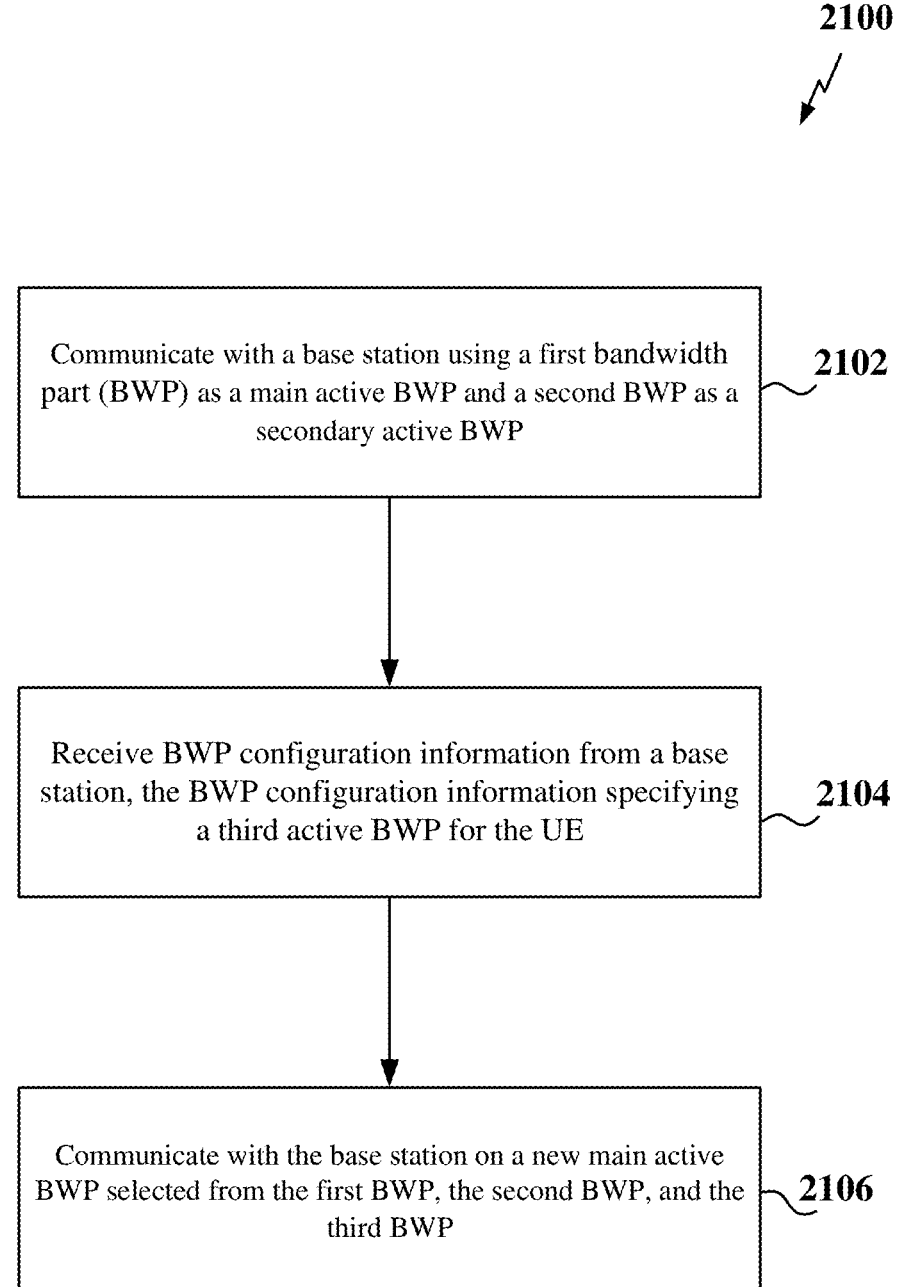

Communicate with a base station using a first bandwidth part (BWP) as a main active BWP and a second BWP as a secondary active BWP — 2102

Receive BWP configuration information from a base station, the BWP configuration information specifying a third active BWP for the UE — 2104

Communicate with the base station on a new main active BWP selected from the first BWP, the second BWP, and the third BWP — 2106

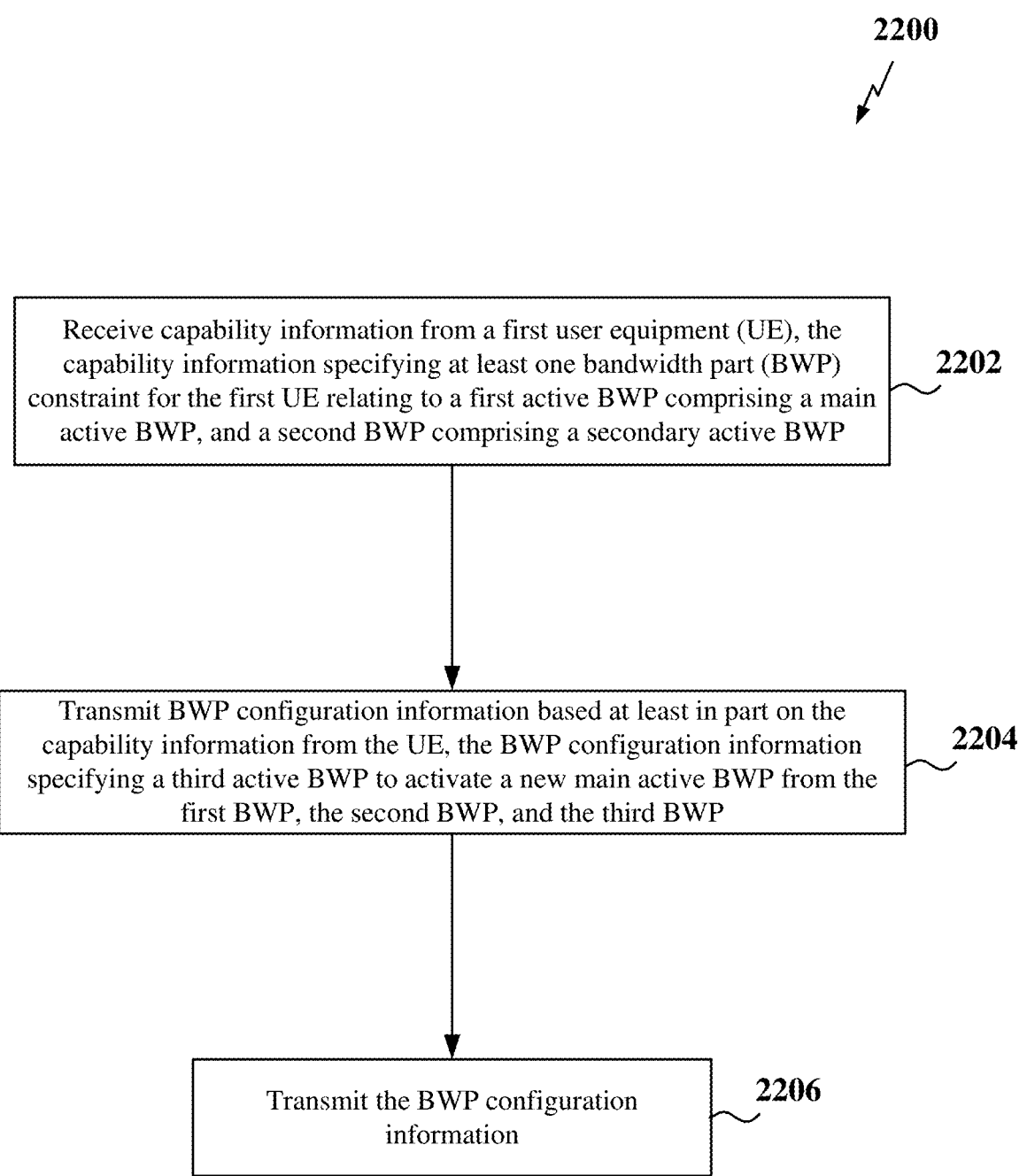

Receive capability information from a first user equipment (UE), the capability information specifying at least one bandwidth part (BWP) constraint for the first UE relating to a first active BWP comprising a main active BWP, and a second BWP comprising a secondary active BWP

2202

Transmit BWP configuration information based at least in part on the capability information from the UE, the BWP configuration information specifying a third active BWP to activate a new main active BWP from the first BWP, the second BWP, and the third BWP

2204

Transmit the BWP configuration information

WIRELESS COMMUNICATION USING MULTIPLE ACTIVE BANDWIDTH PARTS

CROSS-REFERENCE TO RELATED APPLICATIONS

This application is the U.S. national stage of PCT patent application number PCT/US2021/044329 filed on Aug. 3, 2021, which claims priority to Greek patent application Ser. No. 20/200,100467 to Abotabl, et al., filed Aug. 10, 2020, the contents of which is incorporated by reference in its entirety herein.

TECHNICAL FIELD

The technology discussed below relates generally to wireless communication networks, and more particularly, to wireless communication using multiple active bandwidth parts, and cross-switching of bandwidth parts during operation.

INTRODUCTION

Wireless communications are conveyed in uplink (UL) transmissions, from a scheduled entity, such as a user equipment (UE) or other wireless communications device, to a scheduling entity, such as a base station, and in downlink (DL) transmissions from the scheduling entity to the scheduled entity. Frequency division duplex (FDD) communications allow simultaneous two-way communication by separating the frequencies used for uplink (UL) and downlink (DL) transmissions. Separating the frequencies used for UL and DL transmissions allows the UL transmissions to be isolated from the DL transmissions in the frequency domain. The isolation in the frequency domain reduces interference from a transmitter at a receiver during a full duplex communications exchange. Time division duplex (TDD) communications allow non-simultaneous two-way communications by employing one set of frequencies for both UL and DL transmissions in the frequency domain while designating some time slots for UL transmission and other time slots for DL transmission. In TDD half-duplex communications, UL and DL transmissions occur at the same frequencies, and are isolated from one another in time.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a user equipment is disclosed, that includes a transceiver; a memory; and a processor communicatively coupled to the transceiver and the memory, wherein the processor and the memory are configured to: communicate with a base station using a first bandwidth part (BWP) as a main active BWP and a second BWP as a secondary active BWP; receive BWP configuration information from a base station, the BWP configuration information specifying a third active BWP for the UE; and communicate with the base station on a new main active BWP selected from the first BWP, the second BWP, and the third BWP.

In some examples, a method is disclosed of wireless communication at a user equipment (UE), the method including: communicating with a base station using a first bandwidth part (BWP) as a main active BWP and a second BWP as a secondary active BWP; receiving BWP configuration information from a base station, the BWP configuration information specifying a third active BWP for the UE; and communicating with the base station on a new main active BWP selected from the first BWP, the second BWP, and the third BWP.

In some examples, a base station is disclosed, that includes a transceiver; a memory; and a processor communicatively coupled to the transceiver and the memory, wherein the processor and the memory are configured to: receive capability information from a first user equipment (UE), the capability information specifying at least one bandwidth part (BWP) constraint for the first UE relating to a first active BWP comprising a main active BWP, and a second BWP comprising a secondary active BWP; and transmit BWP configuration information based at least in part on the capability information from the UE, the BWP configuration information specifying a third active BWP to activate a new main active BWP from the first BWP, the second BWP, and the third BWP.

In some examples, a method is disclosed of wireless communication at a base station, the method including: receiving capability information from a first user equipment (UE), the capability information specifying at least one bandwidth part (BWP) constraint for the first UE relating to a first active BWP comprising a main active BWP, and a second BWP comprising a secondary active BWP; receiving BWP configuration information based at least in part on the capability information from the UE, the BWP configuration information specifying a third active BWP for reconfiguring the first BWP, the second BWP, and the third BWP to activate a new main active BWP; and transmitting the BWP configuration information.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIG. 15 is a flow chart of an example method involving multiple active BWPs according to some aspects.

FIG. 21 is a flow chart of an example method for BPW cross-switching according to some aspects.

FIG. 22 is a flow chart of an example method for base station communications for BPW cross-switching according to some aspects.

DETAILED DESCRIPTION

Figure 1:
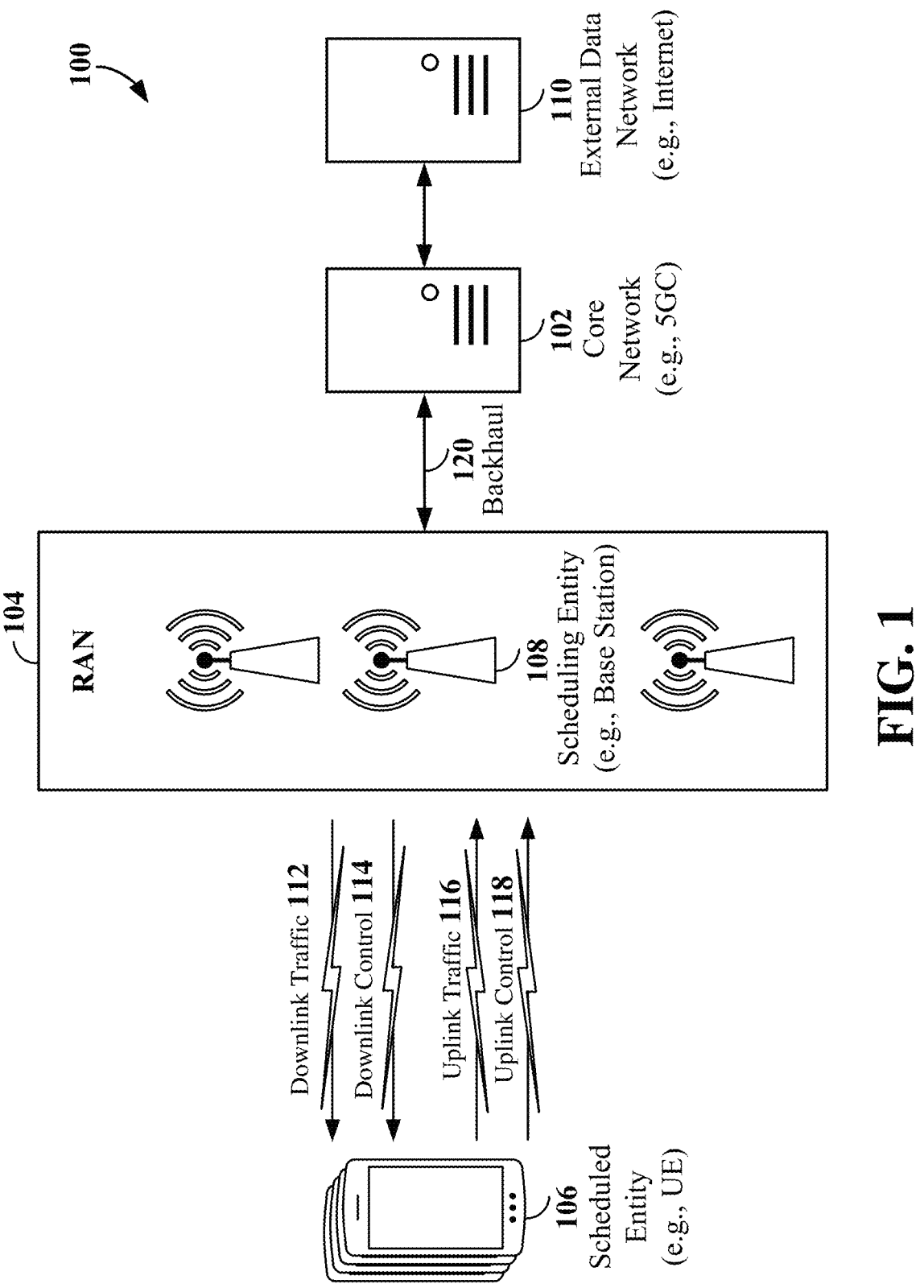
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated arrangements, end-user devices, etc. of varying sizes, shapes, and constitution.

For frequency division duplex (FDD) full duplex (FD) communications to be realized, self-interference from a transmitter of a user equipment (UE) or a base station can be minimized to avoid saturating sensitive amplifiers and front ends of receivers of the UE and base station. To isolate a signal transmitted by a transmitter at a receiver of the same device, the frequency band used by the transmitter may be separated from the frequency band used by the receiver. The gap between the two frequency bands may be referred to as a guard band. For time division duplex (TDD) half-duplex (HD) communications, the need for a guard band is obviated because the transmission band and the reception band are one and the same. A TDD HD scheme therefore uses less bandwidth than an FDD FD scheme, by using the same sub-channels for transmission and reception at separate times.

Work is advancing on the use of TDD frequency resources for both UL and DL in a given time slot. Such use may be referred to herein as TDD full duplex or TDD FD. Scheduled entities (e.g., UEs or other wireless communication devices) that are able to operate in a full duplex mode may be able to use TDD FD to increase the amount of data transferred in comparison to TDD HD, because, as with FDD FD, data may be transmitted and received at the same time, while in contrast to FDD FD, the data may be transmitted and received at the same frequency.

Scheduling entities (e.g., gNBs or other network access nodes) may be early adopters of TDD FD. In this way, the radio access networks will be ready to provide the improved use of bandwidth for scheduled entities as scheduled entities that are TDD FD capable are brought into use. However, not all scheduled entities will be able to implement TDD FD operation. For example, some scheduled entities may have an inexpensive front end that includes a switch that couples an antenna to either the scheduled entity receiver or the scheduled entity transmitter, depending on the state of the switch. Such designs minimize cost and complexity by doing away with relatively expensive and complex multiplexors and/or circulators at the front ends of scheduled entities.

Scheduling entities that are able to conduct TDD FD operations may be oblivious to the capabilities of the scheduled entities they serve and may seek to configure time slots for TDD FD operation. To configure a time slot for TDD FD operation, the scheduling entity may configure a time slot (including a set of OFDM symbols) for simultaneous use of the same frequency resource (e.g., use of one new radio operating band radio channel currently designated for TDD HD operation) for both transmission and reception. An OFDM symbol for TDD FD use may be referred to as a downlink-uplink (DU) symbol. A DU symbol may be different from an uplink (UL) symbol, a downlink (DL) symbol, and a flexible (F) symbol. For example, the DL symbol and the UL symbol are reserved for DL transmission and UL reception, respectively. DL transmission and UL reception are examples of unidirectional communication. DL transmission and UL reception may occur at the same time on different frequencies (as in the case of FDD FD) or at different times at the same frequency (as in the case of TDD HD), but do not occur at the same time at the same frequency (as in the case of TDD FD). The F symbol is interpreted as either a UL symbol or a DL symbol and as such has the same characteristics of either a DL symbol or a UL symbol. An F symbol does not combine the characteristics of the UL symbol and the DL symbol.

Accordingly, a scheduling entity may configure a slot with at least one downlink-uplink (DU) symbol reserved for both downlink transmission to and uplink reception from a scheduled entity (e.g., a UE or other wireless communication device) at the same time at the same frequency. In such a circumstance, the behavior of a non-TDD FD scheduled entity (referred to herein as a scheduled entity, a half-duplex scheduled entity, a full duplex-aware scheduled entity, an FD-aware scheduled entity, a half-duplex UE, an HD UE, a full duplex-aware UE, or an FD-aware UE) may be undefined. According to some aspects, HD UE behavior when encountering a slot formatted with at least one DU symbol may be unchanged compared to a legacy behavior where the HD UE reads only a SlotFormatCombinationID (e.g., 802 of FIG. 8).

Defining the behavior of a non-TDD FD UE when encountering DU symbols may enable the non-TDD FD UE (e.g., new or legacy TDD HD UEs, or full duplex-aware UEs) to continue operations in wireless network environments that begin to use TDD FD transceivers and may provide for ongoing and future use of lower cost non-TDD FD UEs in a TDD FD environment.

The disclosure relates in some aspects to wireless communication using multiple active bandwidth parts (BWPs). For example, a base station may configure a UE with two or more active BWPs. The UE may then use multiple active BWPs for FD communication and/or to improve the switching time from one active BWP to another in general.

Configuring a UE with multiple active BWPs may be subject to one or more constraints (e.g., based on UE capabilities). For example, a UE constraint may specify that the active BWPs have certain bandwidth characteristics (e.g., the combined bandwidths of the active BWPs should not exceed a threshold bandwidth, etc.). As another example, a UE constraint may specify that the active BWPs have certain frequency allocation characteristics (e.g., a minimum guard band, etc.). As a further example, a UE constraint may specify that a physical downlink control channel (PDCCH) configuration of one active BWP is a function of a PDCCH configuration of another active BWP.

A UE may elect to drop one or more active BWPs specified by a BWP configuration. In some examples, a UE may use just one of the active BWPs (e.g., dropping the other active BWP(s)) if the BWP configuration violates a constraint. In some examples, a UE may deem the BWP configuration as an error case (e.g., drop all of the active BWPs) if the BWP configuration violates a constraint.

One active BWP may be deemed a main active BWP and another active BWP deemed a secondary active BWP. In some examples, a UE may select the main active BWP for certain communication operations (e.g., monitoring a PDCCH).

A base station may configure a UE to monitor certain channels and/or signals on certain active BWPs. For example, a UE may be configured to monitor a PDCCH, all physical signals, and all physical channels in all (e.g., both) active BWPs. As another example, a UE may be configured to monitor a PDCCH in one active BWP and operate in all (e.g., both) active BWPs. As a further example, a UE may be configured to monitor a PDCCH, all physical signals, and all physical channels in one active BWP until instructed to switch to another active BWP or until the UE elects to switch to another active BWP (e.g. based on an internal trigger).

A UE may switch from one active BWP to another active BWP based on a slot format type. For example, a UE may use a first active BWP for a half-duplex (HD) slot and use a second active BWP for an FD slot. As another example, a UE may use a first active BWP for a first type of FD slot and use a second active BWP for a second type of FD slot.

A UE may switch from one active BWP to another active BWP based on a signal type. For example, different types of signals may be assigned different priorities. In addition, a base station may configure a UE to use a first active BWP for one type (e.g., priority) of signal and use a second active BWP for another type (e.g., priority) of signal.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic information 112 and/or 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
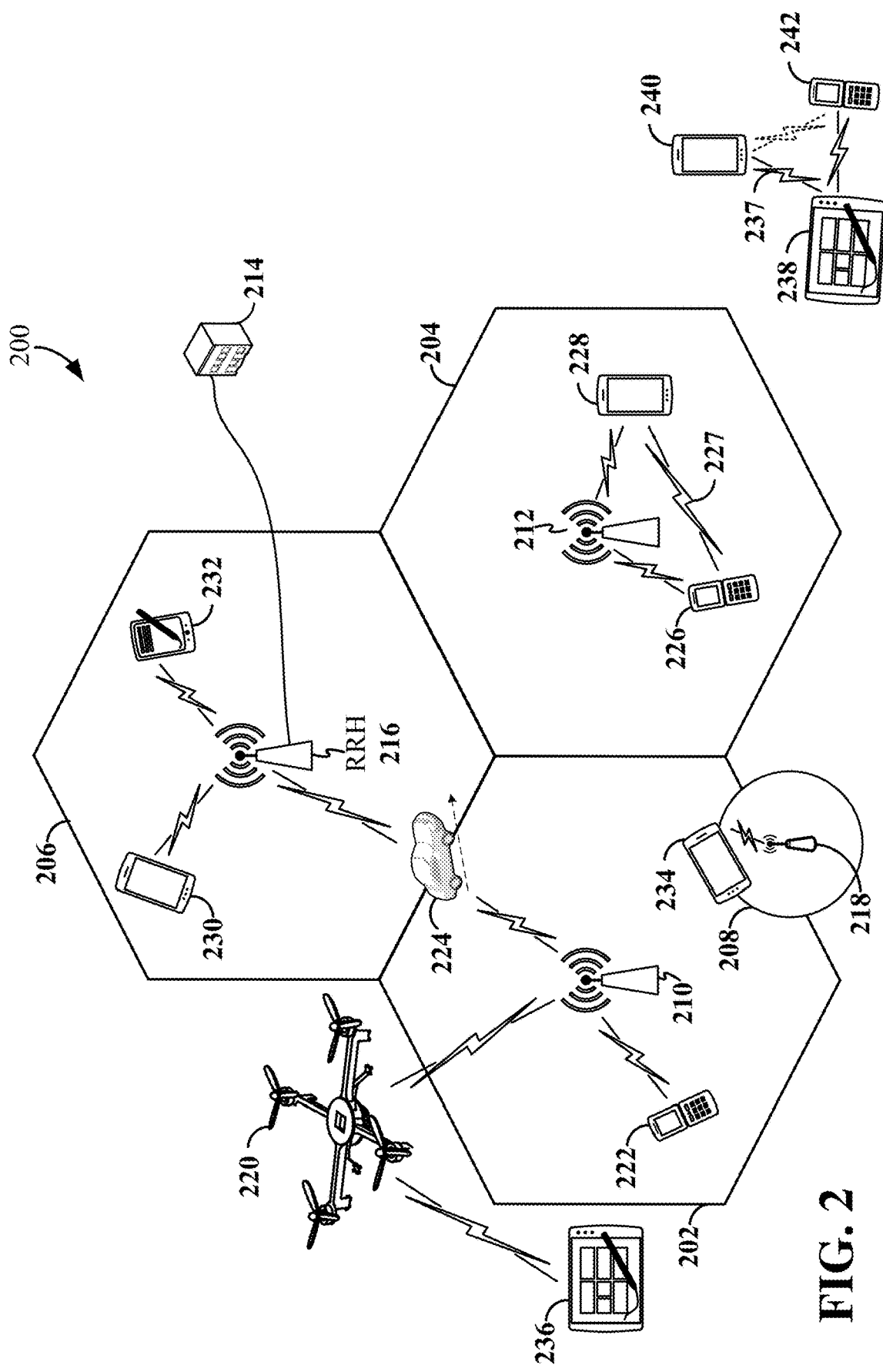
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex or TDD FD.

Figure 3A:
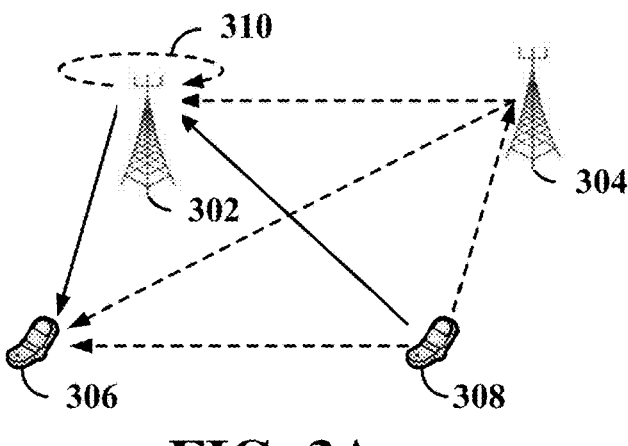
FIGS. 3A, 3B, and 3C are schematic illustrations of a wireless communication network and sources of interference for a full duplex gNB, a half-duplex user equipment (UE), a first full duplex UE, and a second full duplex UE according to some aspects of the disclosure.
Figure 3B:
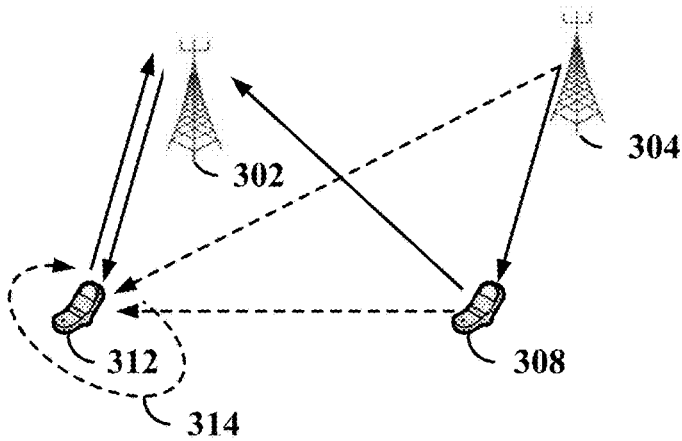
Figure 3C:
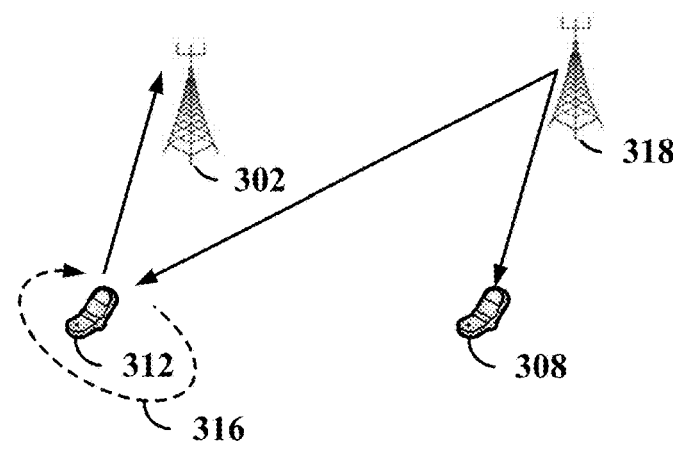

FIGS. 3A, 3B, and 3C are schematic illustrations of a wireless communication network 300 and sources of interference for a full duplex gNB 302 (e.g., a scheduling entity), a half-duplex UE 306, a first full duplex UE 312, and a second full duplex UE 308 according to some aspects of the disclosure. In FIG. 3A, the full duplex gNB 302 is transmitting to the half-duplex UE 306. During the time of the transmission from the full duplex gNB 302 to the half-duplex UE 306, the full duplex gNB 302 is receiving, at its receiver (not shown), self-interference 310 from its own transmission to the half-duplex UE 306 as well as interference from a neighboring gNB 304 and an uplink transmission from a second full duplex UE 308. The half-duplex UE 306 is also receiving interference from the second full duplex UE 308 and the neighboring gNB 304. Because it is a half-duplex UE, the half-duplex UE 306 is not transmitting during the time of the transmission from the full duplex gNB 302 to the half-duplex UE 306, and therefore, the half-duplex UE 306 receives no self-interference.

In FIG. 3B, the full duplex gNB 302 is transmitting a downlink transmission to the first full duplex UE 312. During the time of the transmission of the downlink transmission from the full duplex gNB 302 to the first full duplex UE 312, the full duplex gNB 302 is receiving, at its receiver (not shown), a simultaneous uplink transmission from the first full duplex UE 312. At the same time as the just mentioned simultaneous downlink and uplink transmissions, the first full duplex UE 312 is receiving, at its receiver (not shown), self-interference 314 from its own transmission to the full duplex gNB 302 as well as interference from the neighboring gNB 304 and interference from the second full duplex UE 308.

In FIG. 3C, the full duplex gNB 302 is receiving an uplink transmission from the first full duplex UE 312. During the time of the transmission of the uplink transmission to the full duplex gNB 302, the first full duplex UE 312 is also receiving a transmission from a multi-transmission and reception point (TRP) station (e.g., a macro-cell, small cell, pico-cell, femto-cell, remote radio head, relay node, etc.), here represented as a multi-TRP wireless transceiver station 318. In addition to the signal received from the multi-TRP wireless transceiver station 318, the first full duplex UE 312 is also receiving, at its receiver (not shown), self-interference 316 from its own transmission to the full duplex gNB 302.

For the half-duplex UE 306 of FIG. 3A, interference may be mitigated if the interference from the neighboring gNB 304 and second full duplex UE 308 are at frequencies other than those occupied by the downlink transmission from the full duplex gNB 302 to the half-duplex UE 306. Similarly, for the first full duplex UE 312 of FIGS. 3B and 3C, interference may be mitigated if the self-interference 316 from the first full duplex UE 312, interference from the neighboring gNB 304, and/or interference from the second full duplex UE 308 are at frequencies other than those occupied by the downlink transmission from the full duplex gNB 302 to the half-duplex UE 306.

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
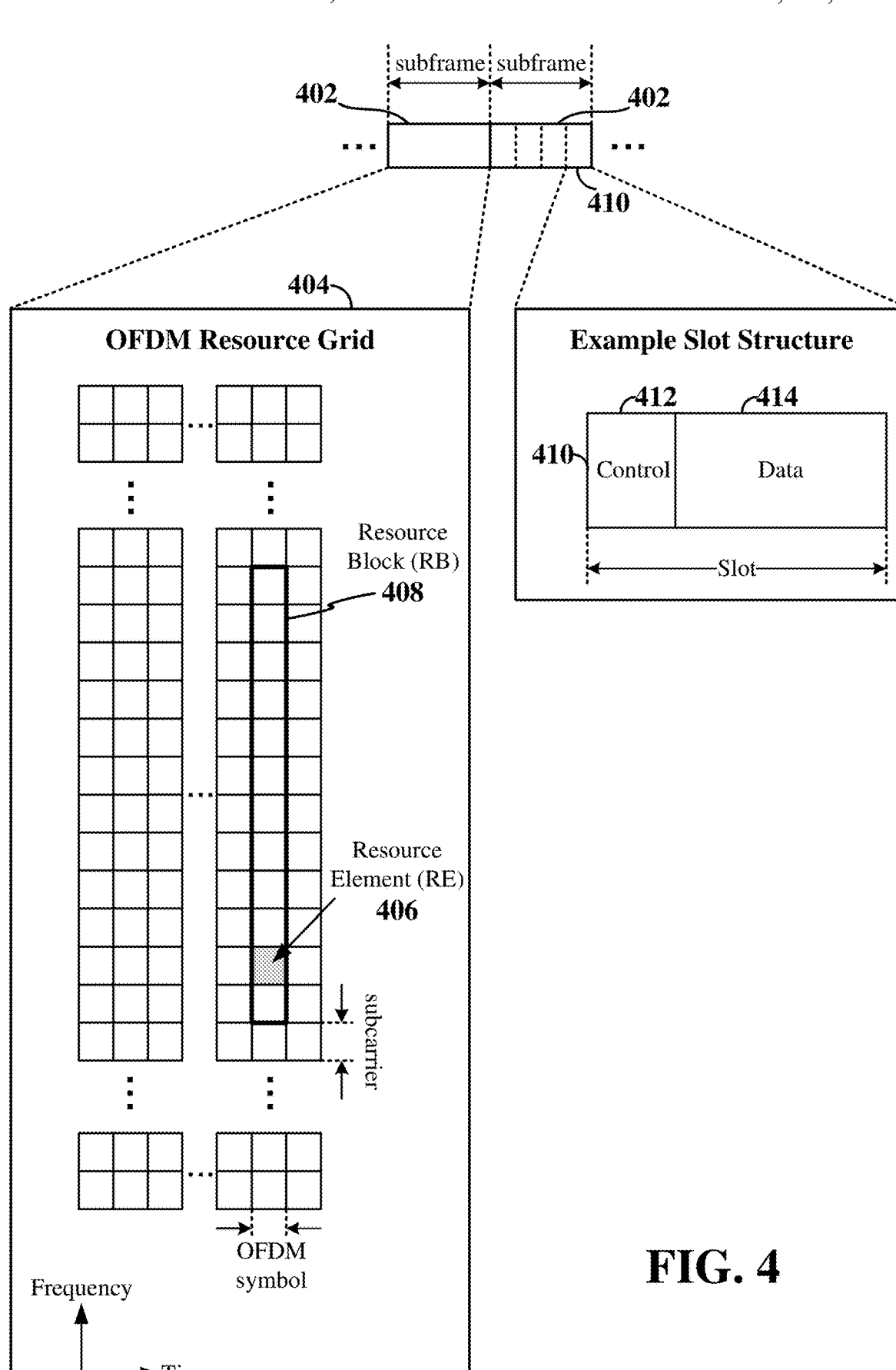
FIG. 4 is a schematic illustration of wireless resources in an air interface utilizing orthogonal frequency divisional multiplexing (OFDM) according to some aspects.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above and illustrated in FIGS. 1-4 are not necessarily all the channels or carriers that may be utilized between a scheduling entity (e.g., base station 108) and scheduled entities (e.g., one of more UE 106), and those of ordinary skill in the art will recognize that other channels or carriers may be utilized in addition to those illustrated, such as other traffic, control, and feedback channels.

Figures 5A, 5B, 5C, 5D:
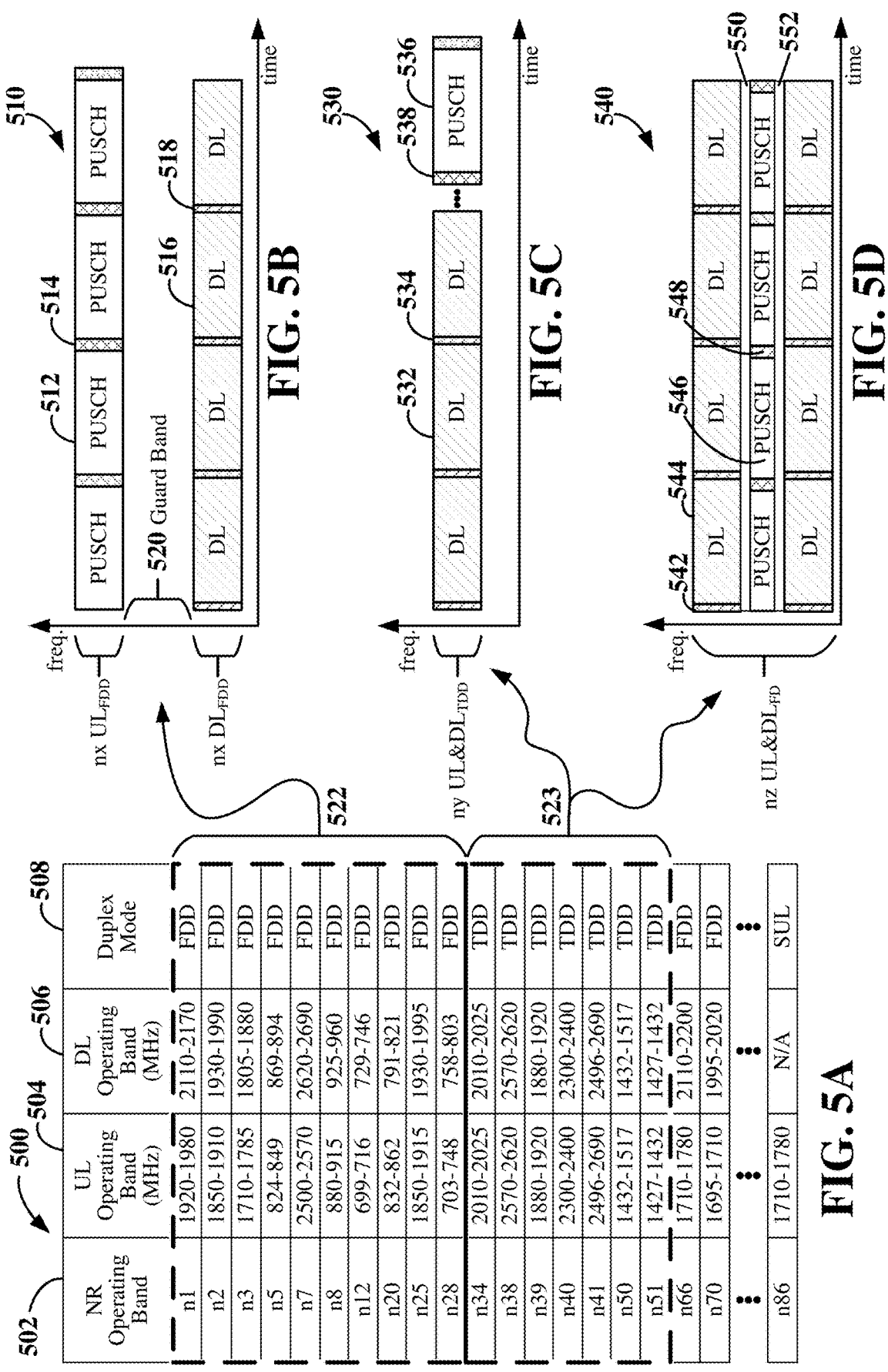
FIG. 5A is a tabular depiction of a plurality of new radio (NR) operating bands (e.g., radio channels), uplink operating band frequencies, downlink operating band frequencies, and the duplex mode associated with each of the NR operating bands according to some aspects.
FIG. 5B is a diagram illustrating a frequency division duplex (FDD) FD modulation scheme according to some aspects.
FIG. 5C is a diagram illustrating a time division duplex (TDD) HD modulation scheme according to some aspects.
FIG. 5D is a diagram illustrating a TDD FD modulation scheme according to some aspects.

FIG. 5A is a tabular depiction 500 of a plurality of new radio (NR) operating bands 502 (e.g., radio channels), UL operating band frequencies 504, DL operating band frequencies 506, and duplex modes 508 associated with each of the NR operating bands 502 according to some aspects of the disclosure.

FIG. 5B is a diagram illustrating an FDD FD modulation scheme 510 according to some aspects of the disclosure. In the example shown in FIG. 5B, time is illustrated along the horizontal axis while frequency is illustrated along the vertical axis. A plurality of physical uplink shared channels (PUSCHs) 512 and uplink control channels 514 are depicted as occupying the UL operating band identified as nx $UL_{FDD}$. A plurality of downlink data channels 516 (e.g., physical downlink shared channels (PDSCHs)) and downlink control channels 518 are depicted as occupying the DL operating band identified as nx $DL_{FDD}$. The UL operating band, nx $UL_{FDD}$, and the DL operating band, nx $DL_{FDD}$, are depicted as being separated in frequency by a guard band 520. The paired use of the nx $UL_{FDD}$ uplink operating band and the nx $DL_{FDD}$ operating band of a given, nx operation band may be referred to as paired spectrum. The nomenclature "nx" represents any one of the NR operating bands 502 designated for FDD duplex mode 508. A sub-group 522 of all NR operating bands 502 designated for FDD duplex mode 508 is denoted in FIG. 5A. The operating bands are exemplary and non-limiting.

FIG. 5C is a diagram illustrating a TDD HD modulation scheme 530 according to some aspects of the disclosure. In the example shown in FIG. 5C, time is illustrated along the horizontal axis while frequency is illustrated along the vertical axis. A plurality of downlink data channels 532 and downlink control channels 534 are depicted as occupying the operating band identified as ny $UL\&DL_{TDD}$. The single operating band, ny $UL\&DL_{TDD}$, is utilized for uplink and downlink by separating the UL and DL information in time (e.g., they do not occupy the same time slots simultaneously). The unpaired use of the nx $UL_{FDD}$ uplink operating band and the nx $DL_{FDD}$ operating band (both at a same frequency, or a same frequency band, of a given, nx operation band may be referred to as unpaired spectrum. A physical uplink shared channel (PUSCH) 536 and uplink control channel 538 are depicted as occupying the single operating band, ny $UL\&DL_{TDD}$. The nomenclature "ny" represents any one of the NR operating bands 502 designated for TDD duplex mode 508. A sub-group 523 of all NR operating bands 502 designated for TDD duplex mode 508 is denoted in FIG. 5A. The operating bands are exemplary and non-limiting.

Figures 6A, 6B, 6C:
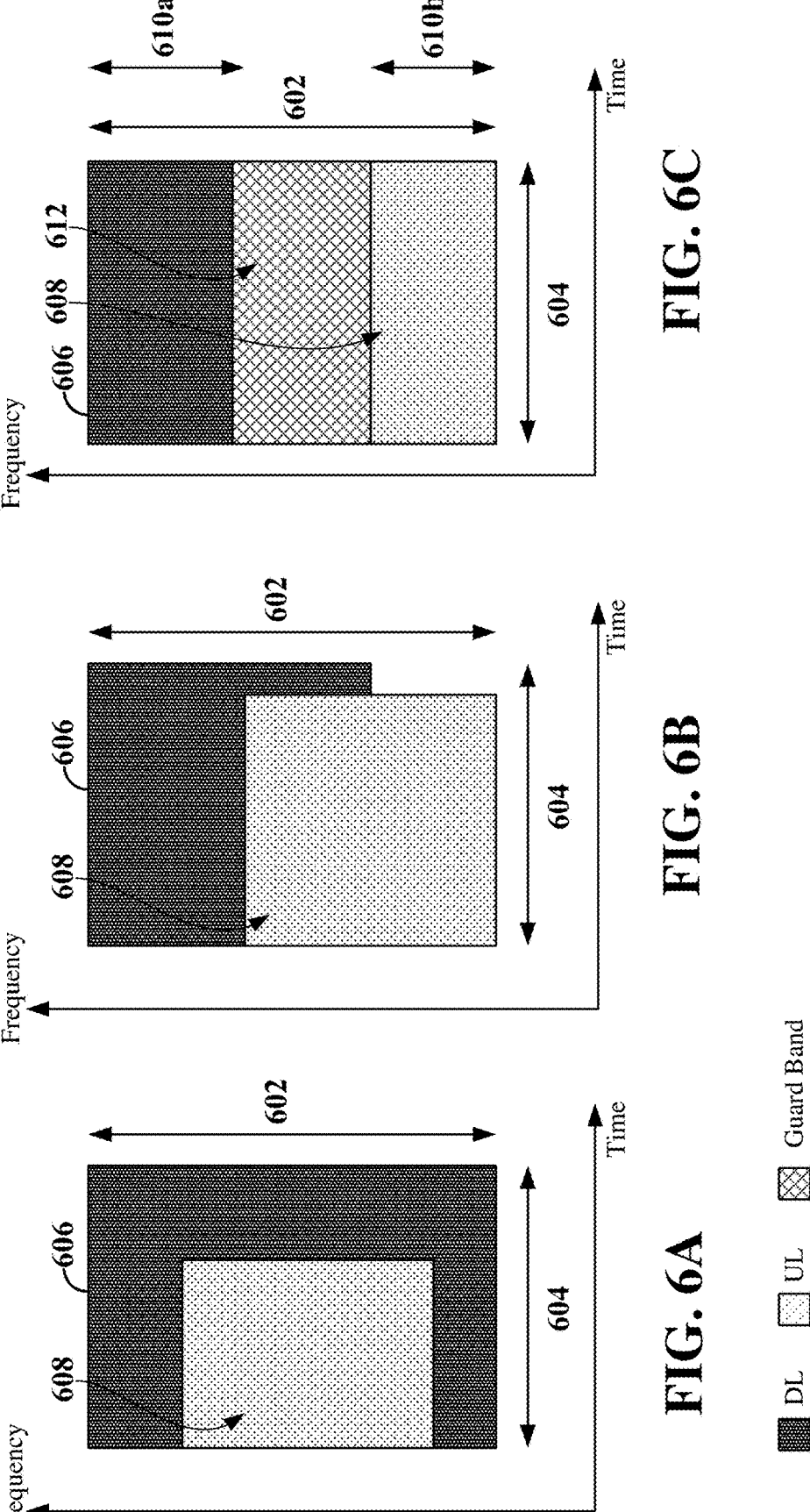
FIGS. 6A, 6B, and 6C illustrate examples of full-duplex communication in unpaired spectrum.

FIG. 5D is a diagram illustrating a TDD FD modulation scheme 540 according to some aspects of the disclosure. In the example shown in FIG. 5D, time is illustrated along the horizontal axis while frequency is illustrated along the vertical axis. As illustrated in the exemplary diagram of FIG. 5D, a full duplex network may utilize sub-band full-duplex (SBFD) (e.g., as illustrated in FIG. 6C) in unpaired spectrum, in which transmissions in different directions are carried in different sub-bands or BWPs of the carrier bandwidth A plurality of downlink data channels 544 and downlink control channels 542 and a plurality of PUSCHs 546 and uplink control channels 548 are all depicted as occupying the operating band identified as nz $UL\&DL_{FD}$. The single operating band, nz $UL\&DL_{FD}$, is utilized for uplink and downlink without separating the UL and DL information in time (e.g., they do occupy the same time slots simultaneously). The nomenclature "nz" represents any one of the NR operating bands 502 designated for TDD duplex mode

508. A sub-group 523 of all NR operating bands 502 designated for TDD duplex mode 508 is denoted in FIG. 5A. A first guard band 550 and a second guard band 552 are depicted in FIG. 5D. The first guard band 550 and the second guard band 552 may be the same bandwidth or different bandwidths. Either or both of the first guard band 550 and the second guard band 552 may be zero bandwidth guard bands. The first guard band 550 and the second guard band 552 (individually or collectively) in the unpaired spectrum may be smaller than the guard band 520 in the paired spectrum.

FIGS. 6A-6C illustrate examples of full-duplex communication in unpaired spectrum. In the examples shown in FIGS. 6A-6C, time is in the horizontal direction and frequency is in the vertical direction. Here, a carrier bandwidth 602 (or set of one or more active bandwidth parts (BWPs)) is illustrated along the frequency axis and a slot 604 is illustrated along the time axis.

FIGS. 6A and 6B illustrate in-band full-duplex (IBFD) communication, while FIG. 6C illustrates sub-band FD (SBFD) communication. For IBFD communication, as shown in FIGS. 6A and 6B, downlink and uplink transmissions occur on the same time and frequency resources. For example, downlink resources 606 allocated for transmissions in the downlink direction overlap in both time and frequency with uplink resources 608 allocated for transmissions in the uplink direction. The overlap may be full (as shown in FIG. 6A) or partial (as shown in FIG. 6B).

For SBFD communication, as shown in FIG. 6C, the carrier bandwidth 602 (or active BWPs) may be divided into sub-bands 610a and 610b. Each sub-band 610a and 610b may be allocated for communication in a single direction. For example, sub-band 610a may be allocated for downlink transmissions, while sub-band 610b may be allocated for uplink transmissions. Thus, downlink resources 606 allocated for transmissions in the downlink direction overlap in time, but not in frequency, with uplink resources 608 allocated for transmissions in the uplink direction. The downlink resources 606 may further be separated from the uplink resources 608 in the frequency domain by a guard band 612 to isolate the uplink and downlink transmissions in frequency.

Figures 7A, 7B:
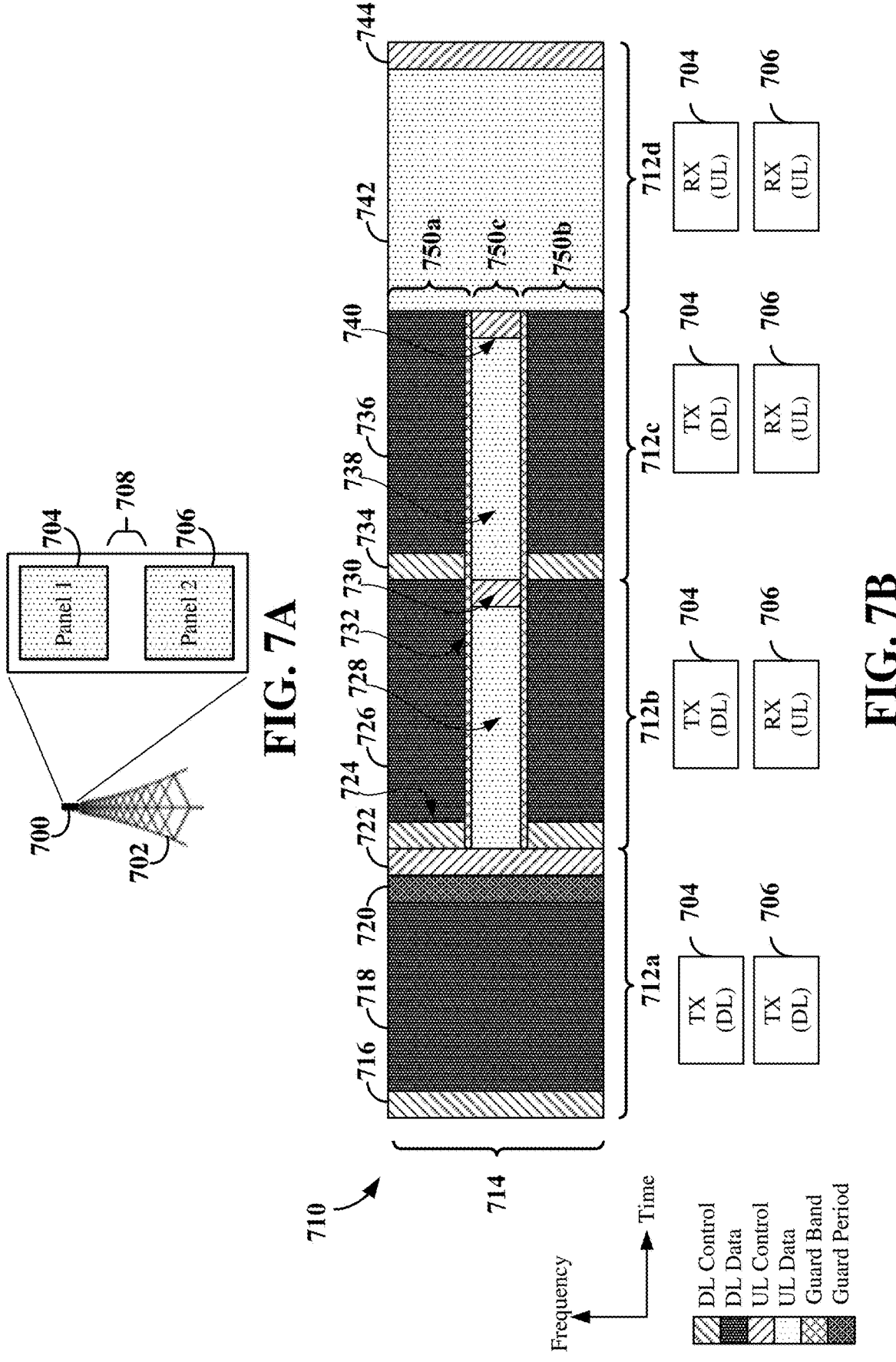
FIG. 7A is a schematic diagram of a base station (e.g., gNB) including a multi-panel antenna array configured for full-duplex communication according to some aspects of the disclosure.
FIG. 7B is a schematic illustration of an example of full-duplex wireless communication using the multi-panel antenna array shown in FIG. 7A according to some aspects of the disclosure.

FIG. 7A is a schematic diagram of a base station 702 (e.g., gNB) including a multi-panel antenna array 700 configured for full-duplex communication according to some aspects of the disclosure. The antenna array 700 is divided into two panels (panel 1 704, panel 2 706) with a physical separation 708 therebetween. Each of the two panels may be a subarray of antennas. A given panel may transmit and/or receive a beam or a beam group. In one example, the panels may be physically separated from one another by a distance selected to provide improved isolation between simultaneous transmission (Tx) and reception (Rx) operations in full-duplex mode, thereby mitigating at least a portion of self-interference resulting from signals being simultaneously transmitted/received. The multi-panel antenna configuration shown in FIG. 7A may also be applicable to UEs to enable full-duplex communication (e.g., SBFD) at the UE.

FIG. 7B is a schematic illustration of an example of sub-band full-duplex (SBFD) wireless communication 710 using the multi-panel antenna array 700 shown in FIG. 7A according to some aspects. In the example shown in FIG. 7B, time is in the horizontal direction with units of slots 712a-712d, each including a plurality of OFDM symbols; and frequency is in the vertical direction. Here, a carrier bandwidth 714 (or set of one or more active BWPs) is illustrated along the frequency axis. The carrier bandwidth

714 (or active BWPs) may be divided into a number of sub-bands 750a-750c for sub-band FD operation.

In the example shown in FIG. 7B, in slot 712a, the antenna array 700 is first configured for downlink (DL) communication (e.g., DL burst 716 and DL data portion 718). The DL burst 716 may include DL control transmitted within the first few symbols of the slot 712a. The DL control may include, for example, a physical downlink control channel (PDCCH) carrying DCI that may be related to the slot 712a or a previous or subsequent slot. In an example, the DCI may include common DCI or UE-specific DCI. The common DCI may include, for example, common control information broadcast to a group of UEs or all UEs in the cell. The UE-specific DCI may include, for example, HARQ feedback information (e.g., ACK/NACK), scheduling information for scheduling a downlink data transmission and/or uplink transmission in the slot 712a or a subsequent slot (e.g., slot 712b, 712c, and/or 712d), and other suitable information. The DL burst 716 may further include various DL reference signals (e.g., SSB and/or CSI-RS). In this example, both panel 1 704 and panel 2 706 may be configured for DL transmission. The DL data portion 718 may include DL data carried within, for example, a PDSCH. In addition to the DL data, the DL data portion 718 may further include DL reference signals (e.g., DMRS) for use in demodulating and decoding the DL data.

Slot 712a may also include a common uplink (UL) burst 722 at the end of slot 712a. The common UL burst 722 may include, for example, a PUCCH carrying UCI and other UL signals. As illustrated in FIG. 7B, the end of the DL data portion 718 may be separated in time from the beginning of the UL burst 722. This time separation 720 may sometimes be referred to as a gap, a guard period, a guard interval, and/or various other suitable terms. This separation may provide time for the base station and UE to perform a switch-over between transmitting and receiving, or vice-versa. In this example, both panel 1 704 and panel 2 706 may be configured for UL transmission during the UL burst 722.

In slots 712b and 712c, the antenna array 700 is configured for both DL communication and UL communication. For example, in slots 712b and 712c, the carrier bandwidth 714 (or active BWPs) is shown partitioned between uplink transmissions and downlink transmissions. Sub-bands 750a and 750b are allocated for downlink transmissions, while sub-band 750c is allocated for uplink transmissions. In an example operation of the sub-band full-duplex configuration shown in FIG. 7, panel 1 704 may be configured for DL transmission at both edges (e.g., sub-bands 750a and 750b) of the carrier bandwidth 714 (or active BWPs) and panel 2 706 may be configured for UL reception in the middle (e.g., sub-band 750c) of the carrier bandwidth 714 (or active BWPs).

In each of the sub-band FD slots 712b and 712c, the DL sub-bands 750a and 750b include a DL burst 724 and 734, respectively, which may include a PDCCH carrying DCI and/or DL reference signals, in the initial or beginning portion of the slots 712b and 712c. Following the DL bursts 724 and 734, slots 712b and 712c each include a DL data portion 726 and 736, respectively, for transmitting DL data within sub-bands 750a and 750b. For example, the DL data may be transmitted within a PDSCH. In addition to the DL data, the DL data portions 726 and 736 may further include DL reference signals (e.g., DMRS) for use in demodulating and decoding the DL data.

In the uplink (UL) sub-band 750c, the slots 712b and 712c each include an UL data portion 728 and 738, respectively, for transmitting UL data. For example, the UL data may be transmitted within a PUSCH. Following the UL data portions 728 and 738, the UL sub-band 750c of slots 712b and 712c each include an UL burst 730 and 740, respectively. The UL burst 730 and 740 may include, for example, a PUCCH including UCI and/or other UL signals. Guard bands 732 are further provided between the UL sub-band 750c and the DL sub-bands 750a and 750b to mitigate self-interference between simultaneous DL transmissions in the DL sub-bands 750a and 750b and UL transmissions in the UL sub-band 750c.

Slots 712b and 712c are sub-band FD slots utilizing FDM for multiplexing uplink and downlink transmissions in frequency. The sub-band full-duplex slot configurations shown in FIG. 7 are merely exemplary, and other configurations of sub-band full-duplex slots may be utilized in various aspects of the disclosure. For example, sub-band full-duplex slots including other configurations of UL and DL sub-bands (e.g., the configuration shown in FIG. 3C or other suitable sub-band configurations), may be employed in various aspects.

In slot 712d, the antenna array 700 is configured for UL communication. For example, slot 712d includes an UL data portion 742 followed by an UL burst 744. The UL data portion 742 and UL burst 744 may include UL control information and/or UL data, as discussed above. In this example, both panel 1 704 and panel 2 706 may be configured for UL reception. Slots 712a and 712d are half-duplex TDD slots utilizing TDM for multiplexing DL transmissions and UL transmissions in time.

In some aspects of the disclosure, one or more slots may be flexible slots including one or more flexible symbols that may be configured as either half-duplex symbols (e.g., all UL or all DL) or sub-band full-duplex symbols (e.g., including both UL and DL transmissions). For example, in slot 712b, the DL burst 724 may be configured to occupy all sub-bands 750a-750c of the slot 712b, and as such, the symbols corresponding to the DL burst 724 may be flexible symbols that may be configured as half-duplex symbols to enable DL communication across all sub-bands 750a-750c. Similarly, the UL burst 730 may be configured to occupy all sub-bands 750a-750c of the slot 712b, and as such, the symbols corresponding to the UL burst 730 may be flexible symbols that may be configured as half-duplex symbols to enable UL communication across all sub-bands 750a-750c.

In sub-band full-duplex operation, the slot formats can be classified according to the duplex mode of the base station. For example, the slot may be classified as a half-duplex slot (e.g., slot 712a or 712b) including symbols dedicated to either DL transmission or UL transmission based on TDM. In addition, the slot may be classified as a full-duplex (or sub-band full-duplex) slot (e.g., slot 712b or 712c) including a hybrid of DL and UL transmissions based on FDM. The slot may further be classified as a flexible slot that may be partially or fully configurable (e.g., one or more symbols may be flexible symbols).

Conventionally, the network may configure up to four BWPs for the DL and up to four BWPs for the UL for a UE. The UE may then select one of these configured active BWPs to use for communication. As mentioned above, a BWP may specify the set of useful frequencies for a UE (e.g., a frequency range within an allocated frequency band that the UE is to monitor for DL transmissions or transmit UL transmissions). Typically, a BWP is contiguous in frequency.

The amount of time it takes to switch from operating in one active BWP to activating another BWP and then operating in the newly activated BWP (BWP switching time)

may be relatively long as indicated in Table 1 below. In Table 1, Type 1 is for so-called fast switching and Type 2 is for so-called slow switching.

TABLE 1

| BWP Switch Delay | | | |
|---|---|---|---|
| NR Slot Length | | BWP Switch delay $T_{BWPswitchDelay}$ (Slots) | |
| μ | (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

[Note 1]Depends on UE capability

Note 2:

If the BWP switch involves changing of SCS, the BWP switch delay is determined by the larger one between the SCS before BWP switch and the SCS after BWP switch.

A UE may be configured to switch from one BWP to another BWP in different ways. In some scenarios, a base station may send a DCI that includes a BWP indicator that specifies the BWP that the UE is to use. In some scenarios (e.g., for a DL BWP), a UE may switch to a default BWP upon expiration of a timer (e.g., a Bwp-InactivityTimer: ServingCellConfig.bwp-InactivityTimer). In some scenarios, a base station may send RRC signaling that specifies the BWP that the UE is to use.

In some scenarios, a MAC entity at the UE may initiate a BWP switch. For example, during a RACH procedure, if the current active BWP is not configured for RACH, the UE may switch to a default BWP to find RACH configurations. For example, upon initiation of a RACH procedure, if PRACH occasions are not configured for the active UL BWP, the MAC layer may switch the active UL BWP to an initial uplink BWP. In contrast, if PRACH occasions are configured for the active UL BWP, the UE will not need to switch the active UL BWP. For the DL, in some examples, a BWP switch may occur if the serving cell is a special cell (SpCell) and if the bwp-id of the active DL BWP is different from the bwp-id of the active UL BWP. An SpCell refers to either a primary cell (PCell) (e.g., a Pcell of a master cell group (MCG)) or a primary secondary cell (PSCell) (e.g., of a secondary cell group (SCG)).

The manner in which a BWP switch occurs may depend on the duplexing method in use. In TDD, a DL and UL BWP switch may occur simultaneously. In FDD, a DL BWP and an UL BWP may switch independently of one another.

The disclosure relates in some aspects to configuring a UE with multiple active BWPs and communication operations relating thereto. Because of the slot format in full-duplex and because of the repetitive switching between HD and FD slots, a UE may use at least two active BWPs in the DL and/or at least two active BWPs in the UL. For example, having at least two active BWPs may reduce (e.g., minimize) the BWP switching time and give more flexibility for FD operation.

A full-duplex UE may be configured with two or more active BWPs in the DL and/or two or more active BWPs in the UL. Constraints on the two BWPs to be active at the same time may be considered such as respective bandwidth of each BWP, the frequency allocation of each BWP, and PDCCH/PDSCH and SPS configurations of each BWP. Different UEs may react differently to violations of these constraints. In some scenarios, such a violation may be due to a base station sending a common BWP configuration to a group of UEs (to conserve resources), where the common BWP configuration may violate the constraints of one or more of the UEs.

In a first example, a UE may not expect that there will be two BWPs active at the same time (e.g., this configuration may violate the imposed constraints for the UE).

In a second example, if a UE receives a configuration for two BWPs active at the same time and this violates the UE's constraints, the UE may drop one of the BWPs. For example, the UE may be configured (by signaling or otherwise) to select the active BWP that has the lowest ID (e.g., the BWP with the highest ID may be dropped).

Figure 8:
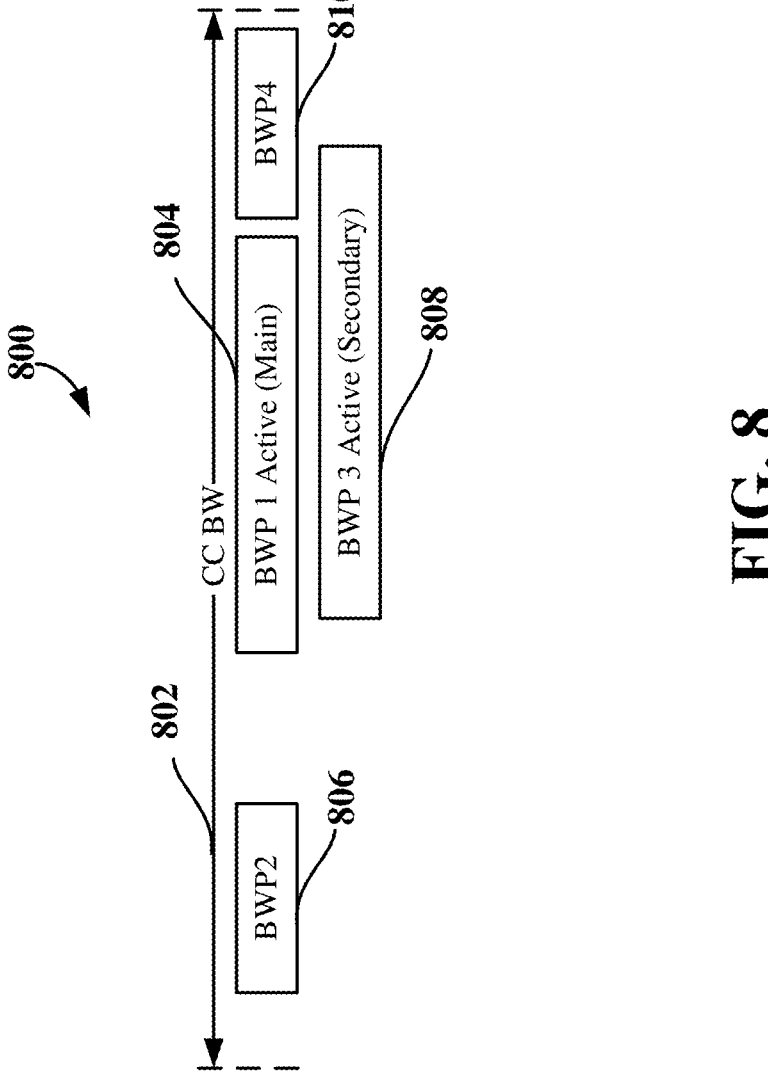
FIG. 8 is a conceptual illustration of an example of allocated bandwidth parts (BWPs) according to some aspects.

The disclosure relates in some aspects to specifying different configurations for different active BWPs for a UE. These configurations may relate to for example, default active BWPs to use and/or information carried by particular active BWPs When a full-duplex UE is configured with two active BWPs, one of the two active BWPs may be designated as the main BWP and the other active BWP designated as a secondary BWP. For example, as shown in FIG. 8, for an allocated bandwidth 802 within which a first BWP 804, a second BWP 806, a third BWP 808, and a fourth BWP 810 are defined, the first BWP 804 may be designated as the main active BWP and the third BWP 808 may be designated as the secondary active BWP.

The main and secondary BWPs may be specified in different ways. In some examples, the active BWP with the smaller ID is designated as the main BWP and the active BWP with the larger ID is designated as the secondary BWP. The main and secondary BWPs may be defined via RRC configuration, DCI signaling, MAC-CE signaling, or some other type of signaling.

In some examples, a UE may perform designated operations on designated BWPs. Thus, a UE does not necessarily perform all operations on all BWPs. For example, a UE may be configured to monitor PDCCH, all physical signals, and channels in all (e.g., both) active BWPs. As another example, a UE may be configured to monitor PDCCH in one BWP and operate in all (e.g., both) active BWPs (e.g., in a manner similar to cross-carrier scheduling). As a further example, a UE may be configured to monitor all physical signals and channels in one BWP until the UE is signaled to do otherwise or switch implicitly. The above configurations may be signaled via RRC signaling or some other type of signaling.

Figure 9:
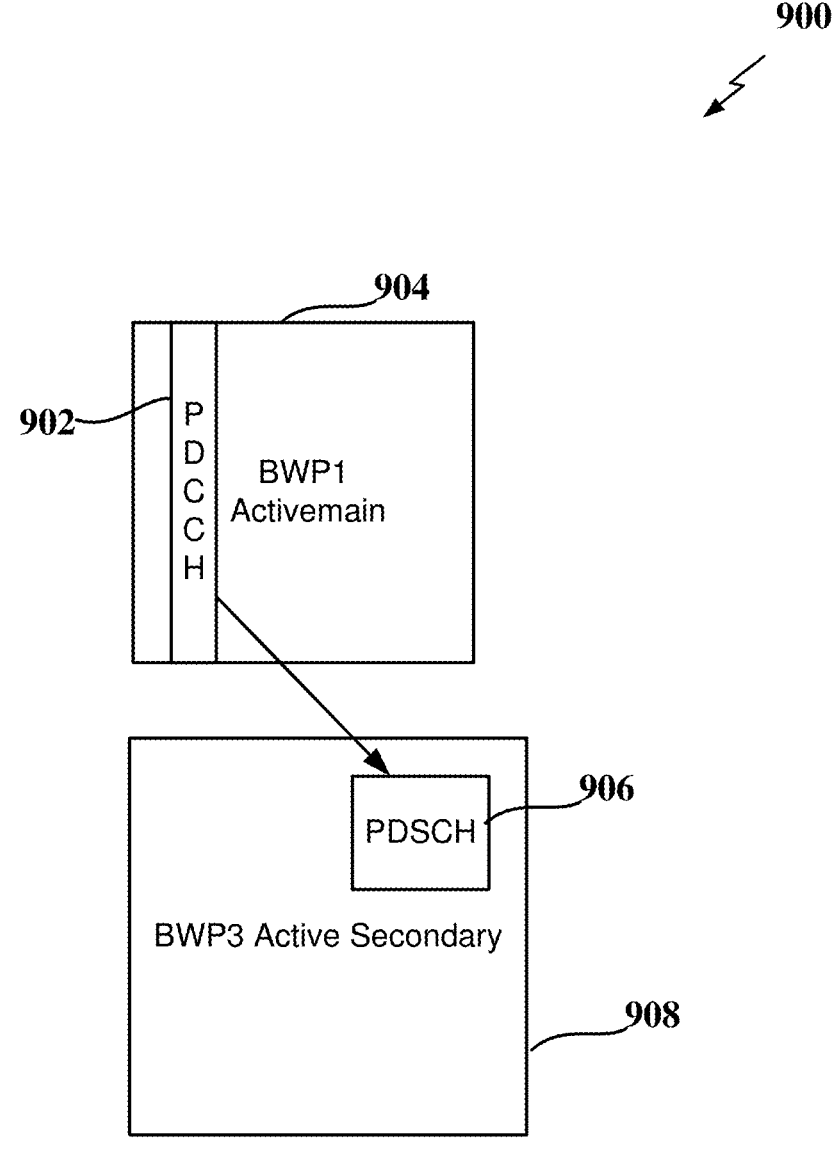
FIG. 9 is a conceptual illustration of an example of cross BWP scheduling according to some aspects.

The disclosure relates in some aspects to cross-BWP scheduling. Here, a UE may be configured to monitor PDCCH in one BWP and operate in one or both BWPs (e.g., receive PDSCH in one or both active BWPs based on scheduling carried by the PDCCH). For example, as shown in the cross-BWP scheduling 900 of FIG. 9, a PDCCH 902 carried by a first active BWP 904 (e.g., the main active BWP) may indicate that a PDSCH 906 is scheduled in a second active BWP 908 (e.g., the secondary active BWP). In some aspects, this may save power when monitoring PDCCH since the UE need not monitor both BWPs. In addition, this scheduling is not constrained by a time delay imposed by BWP switching since the BWP switching time is essentially zero.

A decision as to which active BWP the UE is to monitor may be made in different ways. In some examples, the BWP configuration may include an indication (e.g., one bit) that specifies in which BWP the UE is to monitor for PDCCH. In some examples, the UE monitors the PDCCH only in the main BWP.

The disclosure relates in some aspects to implicit switching between active BWPs. A UE may elect to monitor a particular active BWP depending on one or more of the following: the slot format (e.g., HD or FD), the FD slot frequency domain format (e.g., UL or DL bandwidth), or the priority of the signals.

Figure 10:
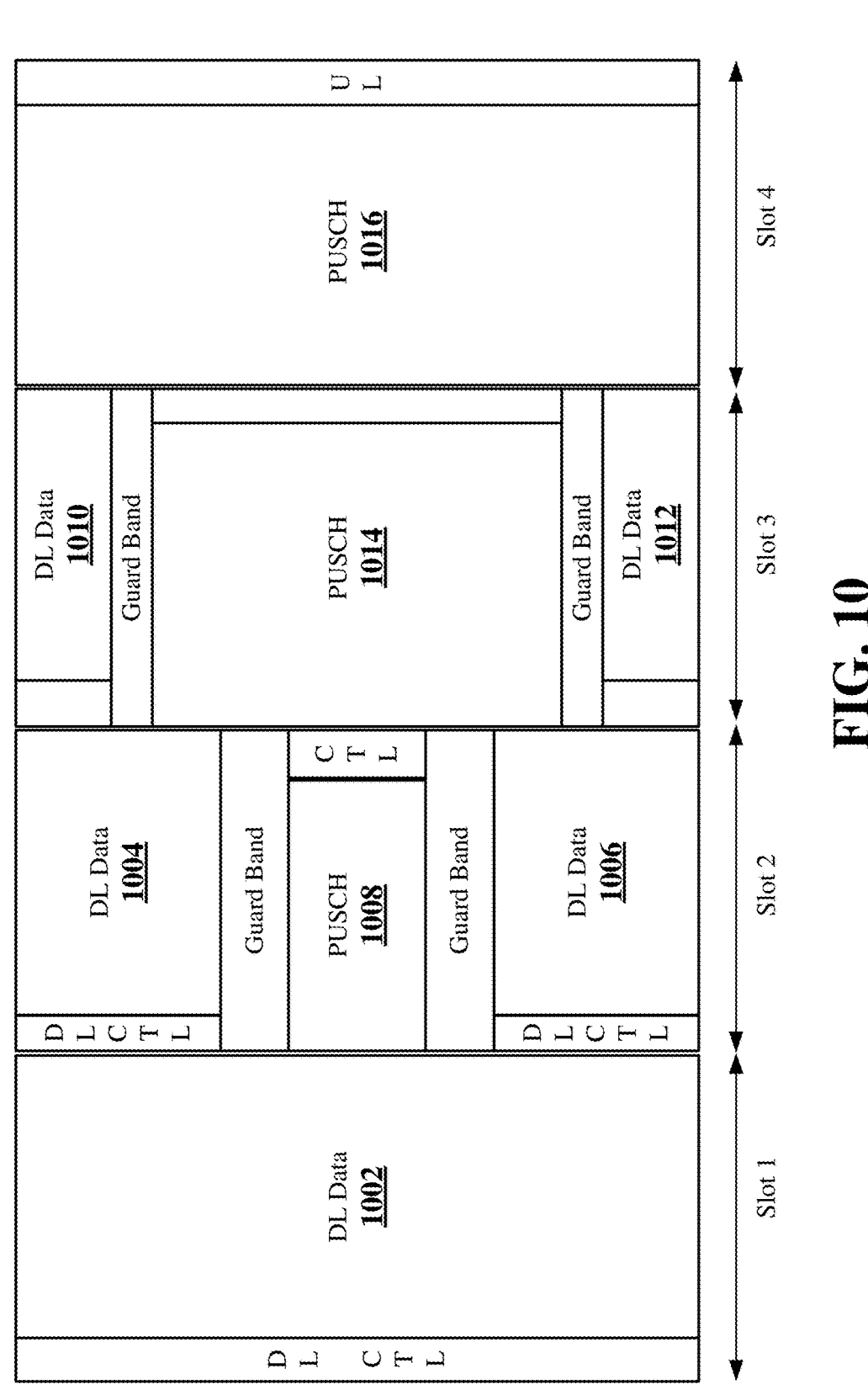
FIG. 10 is a conceptual illustration of an example of different slot formats according to some aspects.

FIG. 10 illustrates a set of time slots (slots) 1000 where different slots have different slot formats. Slot 1 is an HD slot for DL information only (e.g., DL control and DL Data 1002, such as a PDSCH) while slot 4 is an HD slot for UL information only (e.g., UL control and UL Data, such as a PUSCH 1016). In contrast, slots 2 and 3 are FD slots. In some examples, a UE may use a first active BWP (e.g., the main BWP) for slot 1 (HD) and use a second active BWP (e.g., the secondary BWP) for slot 2 (FD). In some examples, a UE may use a first active BWP (e.g., the main BWP with an UL bandwidth <20 MHz) for slot 2 and use a second active BWP (e.g., the secondary BWP with an UL bandwidth >20 MHz) for slot 3. Here, slot 2 and slot 3 are different types of FD slots in that they are defined to carry DL data and PUSCH in different ways. Specifically, a wider bandwidth is supported for DL data 1004 and 1006 in slot 2 than for DL data 1010 and 1012 in slot 3. In addition, a wider bandwidth is supported for PUSCH 1014 in slot 3 than for PUSCH 1008 in slot 2. Other types of different FD slots may be used in other examples.

In some examples, each active BWP may be configured with a set of signals and/or channels with a priority level. For example, if the UE is receiving a given high priority level signal, the UE may operate on the first active BWP and if the UE is receiving a given low priority level signal, the UE may operate on the second active BWP. In addition, the two active BWPs can be configured with different sub-carrier spacings (SCSs) to support different latency requirements.

Figure 11:
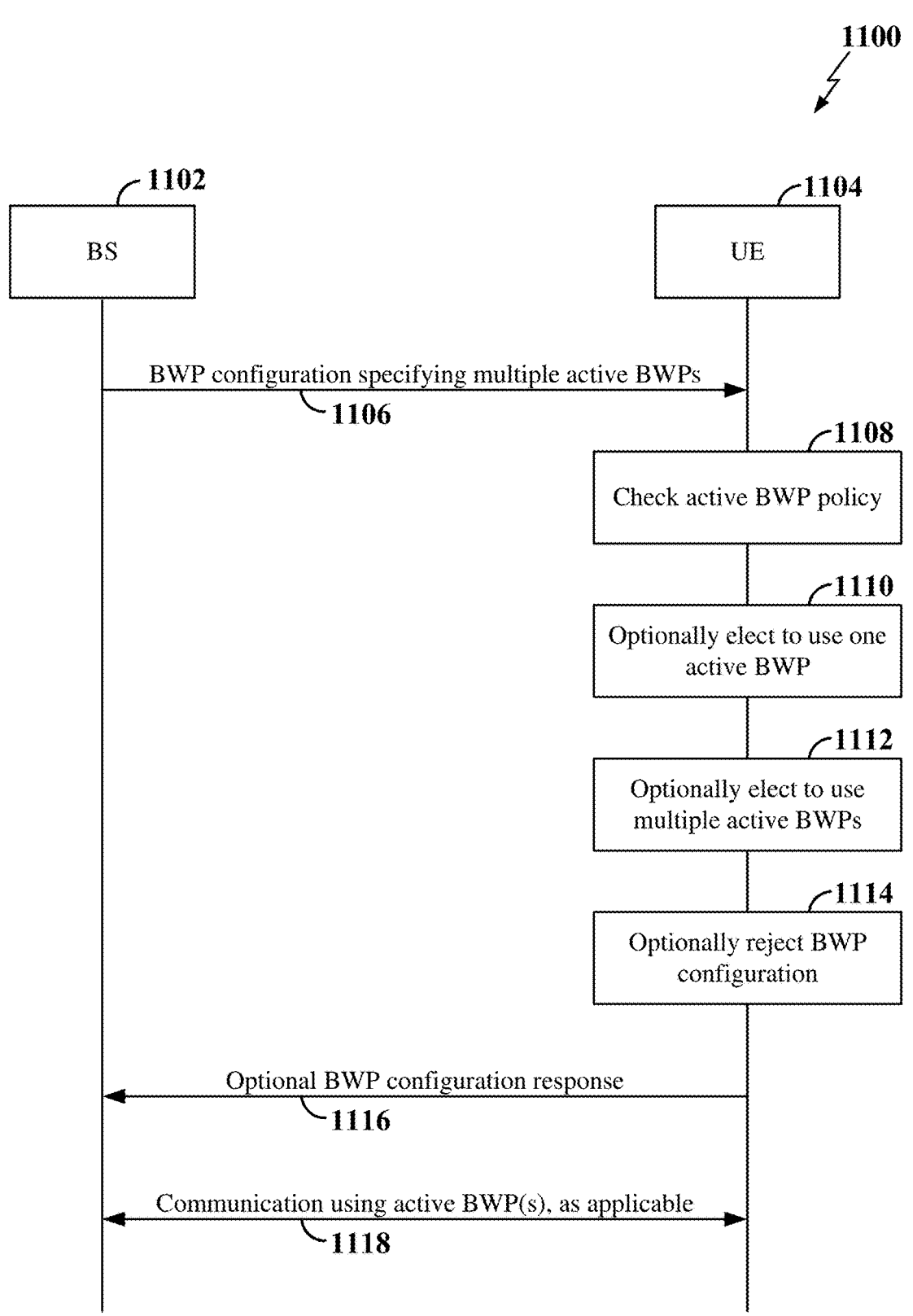
FIG. 11 is a signaling diagram illustrating an example of BWP-related signaling between a UE and a gNB according to some aspects.

FIG. 11 illustrates an example of signaling 1100 in a wireless communication network including a BS 1102 and a UE 1104. In some examples, the UE 1104 may correspond to any of the UEs or scheduled entities shown in FIGS. 1, 2, 3A, 3B, 3C, 7A, and/or 7B. In some examples, the BS 1102 may correspond to one or more of the BSs or scheduling entities shown in FIGS. 1, 2, 3A, 3B, 3C, 7A, and/or 7B.

At 1106 of FIG. 11, the BS 1102 sends a BWP configuration to the UE 1104. The BWP configuration specifies multiple (e.g., two) active BWPs. At 1108, the UE 1104 checks the BWP configuration against the UE's active BWP policies. These policies may relate to, for example, the respective bandwidth of each BWP (UL or DL), the frequency allocation of each BWP, and the PDCCH, PDSCH, SPS, PUCCH, PUSCH, and SRS configurations of each BWP. Optionally, at 1110, the UE 1104 may elect to use only one of the active BWPs. For example, the use of two active BWPs (as configured by the network) may violate a policy of the UE 1104. Optionally, at 1112, the UE 1104 may elect to use two or more of the active BWPs. For example, the use of all active BWPs (as configured by the network) may be supported by the UE 1104. Optionally, at 1114, the UE 1104 may elect to reject the BWP configuration. For example, the use of the active BWPs (as configured by the network) may violate a policy of the UE 1104 and the UE may flag the BWP configuration as an error. Optionally, at 1116, the UE 1104 may send a BWP configuration response to the BS 1102. For example, the response may indicate whether the UE 1104 will use none, one, or two of the active BWPs. At 1118, the UE 1104 and the BS 1102 may communicate via one or more of the active BWPs that the UE 1104 elected to use. These active BWPs may be for the UL or the DL.

Figure 12:
FIG. 12 is a signaling diagram illustrating another example of BWP-related signaling between a UE and a gNB according to some aspects.

FIG. 12 illustrates an example of signaling 1200 in a wireless communication network including a BS 1202 and a UE 1204. In some examples, the UE 1204 may correspond to any of the UEs or scheduled entities shown in FIGS. 1, 2, 3A, 3B, 3C, 7A, and/or 7B. In some examples, the BS 1202 may correspond to one or more of the BSs or scheduling entities shown in FIGS. 1, 2, 3A, 3B, 3C, 7A, and/or 7B.

At optional block 1206 of FIG. 12, the BS 602 may send a configuration to the UE 604. The configuration specifies which active BWP is the main active BWP. At 1208, the UE 1204 selects an active BWP to use for a communication operation. In some examples, the UE 1204 may select the main active BWP as signaled at 1206. In some examples, the UE 1204 may select an active BWP based on an identifier of the active BWP (e.g., the active BWP with the lowest ID). At optional 1210, the BS 602 may send another configuration to the UE 604. This configuration specifies which active BWPs to use for channel and/or signal monitoring.

At 1212, the UE 1204 selects an active BWP to use for channel and/or signal monitoring. In some examples, the UE 1204 may select the active BWP as signaled at 1210. In some examples, the UE 1204 may select an active BWP based on some other configuration. At optional 1214, the BS 602 may send another configuration to the UE 604. This configuration specifies which active BWPs are to be used for different types of signals (e.g., different priority signals). At 1212, the UE 1204 selects an active BWP to use for receiving a particular type of signal (e.g., a high priority signal or a low priority signal). In some examples, the UE 1204 may select the active BWP as signaled at 1214. In some examples, the UE 1204 may select an active BWP based on some other configuration.

Figure 13:
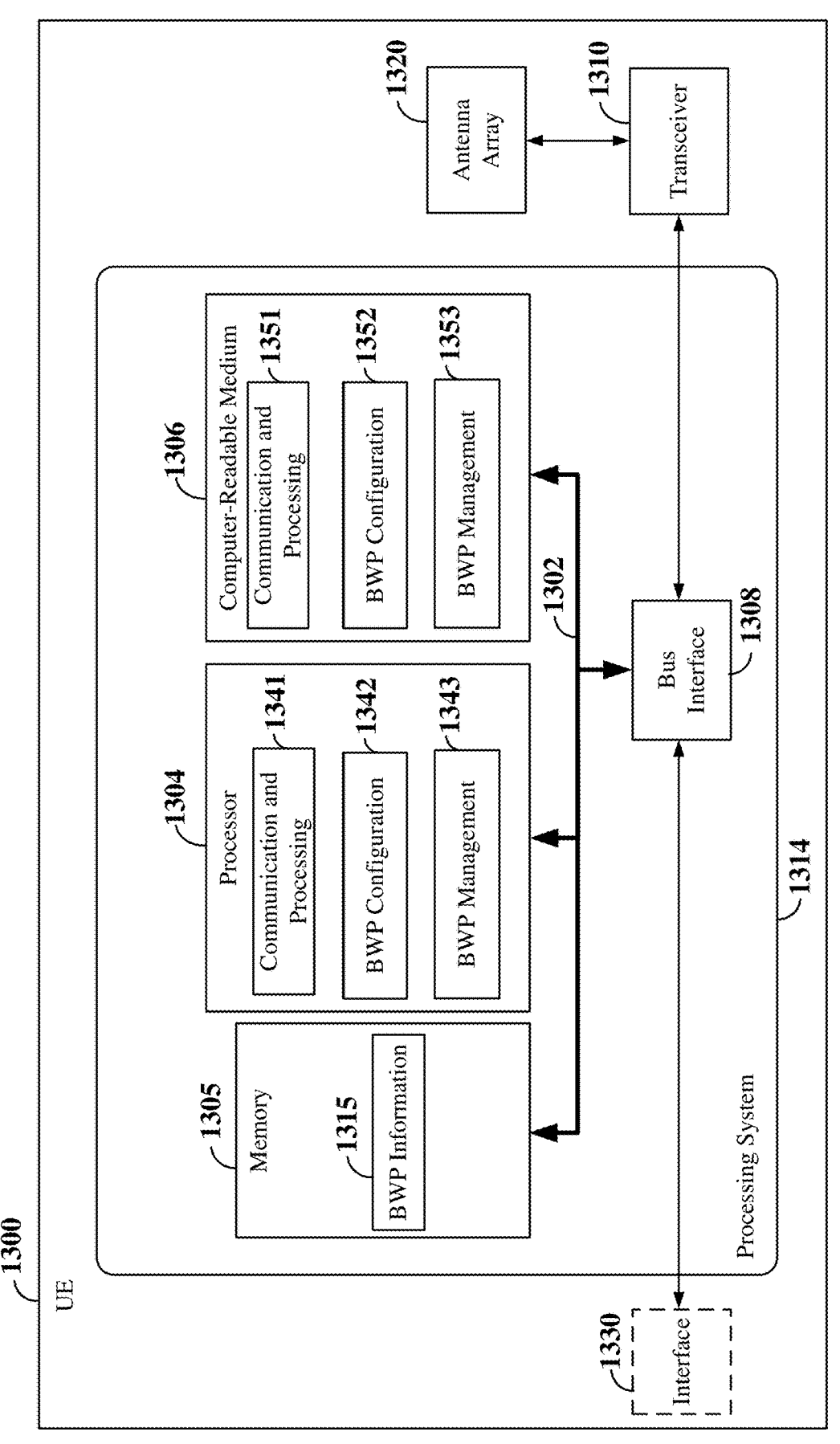
FIG. 13 is a block diagram illustrating an example of a hardware implementation for a UE employing a processing system according to some aspects.

FIG. 13 is a block diagram illustrating an example of a hardware implementation for a UE 1300 employing a processing system 1314. For example, the UE 1300 may be a user equipment (UE) or other device configured to wirelessly communicate with a base station, as discussed in any one or more of FIGS. 1-12. In some implementations, the UE 1300 may correspond to any of the UEs or scheduled entities shown in FIGS. 1, 2, 3A, 3B, 3C, 7A, 7B, 11 and/or 12.

In accordance with various aspects of the disclosure, an element, or any portion of an element, or any combination of elements may be implemented with the processing system 1314. The processing system 1314 may include one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in a UE 1300, may be used to implement any one or more of the processes and procedures described herein.

The processor 1304 may in some instances be implemented via a baseband or modem chip and in other implementations, the processor 1304 may itself comprise a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and between the bus 1302 and an interface 1330. The transceiver 1310 provides a communication interface or means for communicating with various other apparatus over a wireless transmission medium. The interface 1330 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1330 may include a user interface (e.g., keypad, display, speaker, microphone, joystick). Of course, such a user interface is optional, and may be omitted in some examples, such as an IoT device.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1300 may be configured to perform any one or more of the operations described herein (e.g., as described above in conjunction with FIGS. 1-12 and as described below in conjunction with FIGS. 14-15 and 18-20). In some aspects of the disclosure, the processor 1304, as utilized in the UE 1300, may include circuitry configured for various functions.

For example, the processor 1304 may include communication and processing circuitry 1341, configured to communicate with a RAN node (e.g., a base station, such as a gNB). In some examples, the communication and processing circuitry 1341 may include one or more hardware components that provide the means and physical structure that performs processes related to wireless communication (e.g., signal reception and/or signal transmission) and signal processing (e.g., processing a received signal and/or processing a signal for transmission).

The communication and processing circuitry 1341 may obtain information from a component of the scheduled entity 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving.

In some implementations where the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., means for transmitting). In some examples, the communication and processing circuitry 1341 may communicate UE capability information and BWP configuration information.

The communication and processing circuitry 1341 may further be configured to execute communication and processing software 1351 stored in the computer-readable medium 1306 to implement one or more of the functions described herein.

The processor 1304 may include BWP configuration circuitry 1342 configured to perform BWP configuration-related operations as discussed herein. The BWP configuration circuitry 1342 may provide a means for receiving BWP configuration information. The BWP configuration circuitry 1342 may further be configured to receive BWP information 1315 from memory 1305, and may be further configured to execute BWP configuration software 1352 included on the computer-readable medium 1306 to implement one or more functions described herein.

The processor 1304 may include BWP management circuitry 1343 configured to perform BWP management-related operations as discussed herein. The BWP management circuitry 1343 may provide a means for selecting an active BWP. The BWP management circuitry 1343 may further provide a means for determining that BWP configuration information is a violation of a constraint. The BWP management circuitry 1343 may further be configured to receive BWP information 1315 from memory 1305, and may be further configured to execute BWP management software 1353 included on the computer-readable medium 1306 to implement one or more functions described herein.

Figure 14:
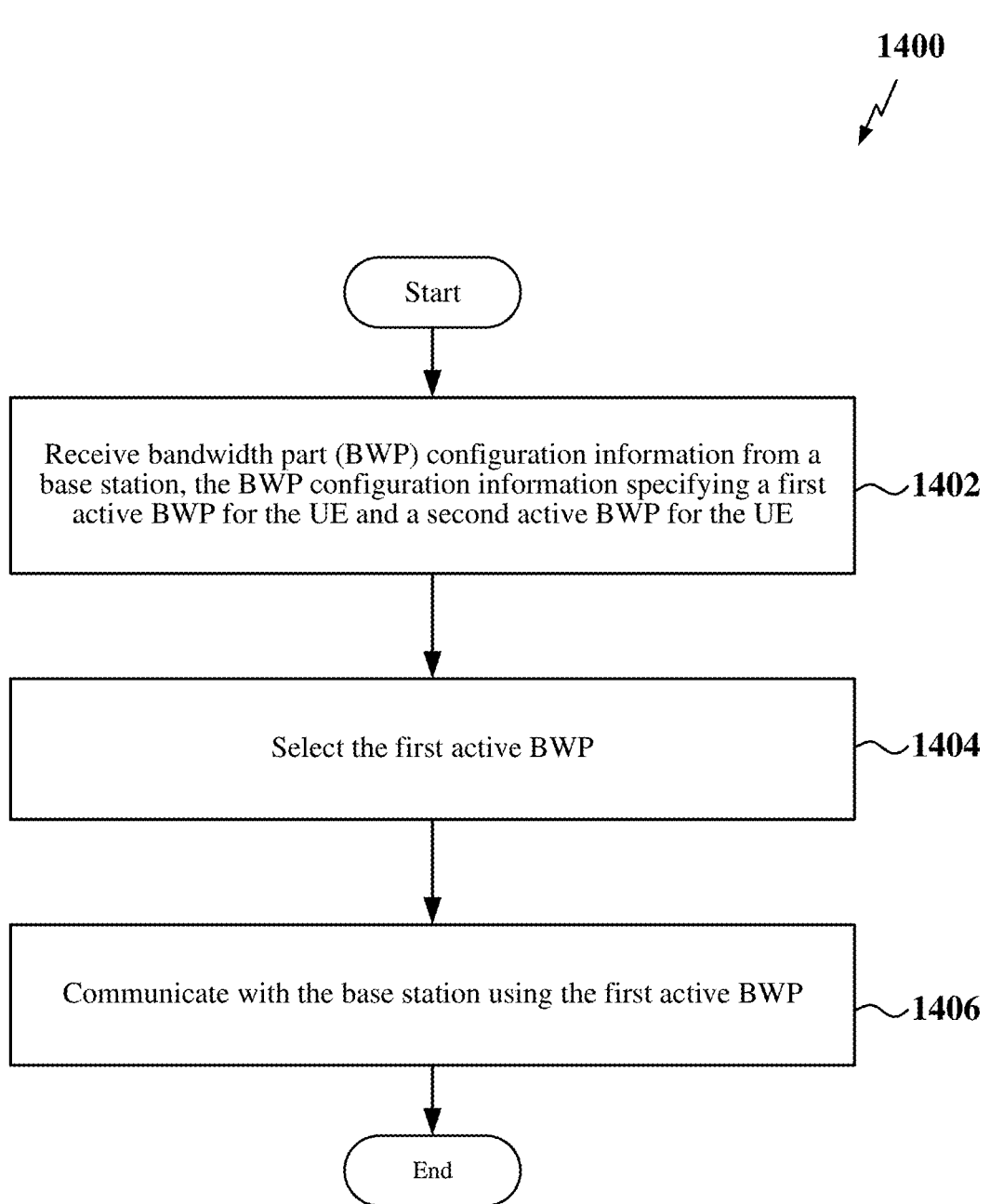
FIG. 14 is a flow chart of an example method using multiple active BWPs according to some aspects.

FIG. 14 is a flow chart illustrating an example method 1400 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the method 1400 may be carried out by the UE 1300 illustrated in FIG. 13. In some examples, the method 1400 may be carried out by any suitable apparatus or means for carrying out the functions or algorithm described below.

At block 1402, a UE may receive bandwidth part (BWP) configuration information from a base station, the BWP configuration information specifying a first active BWP for the UE and a second active BWP for the UE. For example, the BWP configuration circuitry 1342 together with the communication and processing circuitry 1341 and the transceiver 1310, shown and described above in connection with FIG. 13, may receive and process a BWP configuration.

In some examples, the BWP configuration information further specifies at least one third active BWP for the UE. In some examples, the BWP configuration information may include a common BWP configuration for a plurality of UEs. In some examples, receiving the BWP configuration information from the base station may include receiving the BWP configuration information via a radio resource control (RRC) message.

At block 1404, the UE may select the first active BWP. For example, the BWP management circuitry 1343, shown and described above in connection with FIG. 13, may select at least one active BWP based on one or more of the techniques described herein.

In some examples, selecting the first active BWP may include comparing a first identifier of the first active BWP to a second identifier of the second active BWP, determining that the first identifier has a lower value than the second identifier, and selecting the first active BWP for the communicating with the base station after determining that the first identifier has a lower value than the second identifier.

In some examples, selecting the first active BWP may include determining that the first active BWP is designated as a main active BWP. In some examples, the second active BWP is designated as a secondary active BWP.

At block 1406, the UE may communicate with the base station using the first active BWP. For example, the BWP management circuitry 1343 together with the communication and processing circuitry 1341 and the transceiver 1310, shown and described above in connection with FIG. 13, may communication with the base station via an UL BWP and/or a DL BWP.

The UE may receive different types of configuration information. In some examples, the method may further include receiving configuration information specifying that the first active BWP is designated as the main active BWP and the second active BWP is designated as the secondary active BWP. In some examples, the method further includes receiving configuration information specifying that the UE is to monitor physical channels and physical signals in both the first active BWP and the second active BWP. In some examples, the method may further include receiving configuration information specifying that the UE is to monitor a physical downlink control channel (PDCCH) in the first active BWP, and communicate physical downlink shared channel (PDSCH) information in both the first active BWP and the second active BWP. In some examples, the method may further include receiving configuration information specifying that the UE is to monitor physical channels and physical signals in the first active BWP until the UE is signaled to monitor a different active BWP. In some examples, the method may further include receiving configuration information specifying that the UE is to monitor physical channels and physical signals in the first active BWP until the UE elects to monitor a different active BWP.

In some examples, the method may further include receiving an indication that specifies in which active BWP the UE is to monitor a physical downlink control channel (PDCCH).

In some examples, the method may further include determining that the first active BWP is designated as a main active BWP, and monitoring a physical downlink control channel (PDCCH) in the first active BWP as a result of determining that the first active BWP is designated as the main active BWP.

In some examples, the method may further include receiving a downlink control information (DCI) via a physical downlink control channel (PDCCH) in the first active BWP, wherein the DCI identifies a physical downlink shared channel (PDSCH) in the second active BWP, and transmitting or receiving information in the PDSCH in the second active BWP as a result of receiving the DCI.

In some examples, the method may further include identifying a switch from a first time slot format to a second time slot format, and switching from communicating in the first active BWP for the first time slot format to communicating in the second active BWP for the second time slot format. In some examples, the first time slot format is a half-duplex (HD) format, and the second time slot format is a full duplex (FD) format. In some examples, the first time slot format is a first type of full duplex (FD) format, and the second time slot format is a second type of FD format. In some examples, the first type of FD format is for a first uplink or downlink band with a first bandwidth that is less than a threshold bandwidth, and the second type of FD format is for a second uplink or downlink band with a second bandwidth that is greater than the threshold bandwidth.

In some examples, the method may further include receiving configuration information specifying that the first active BWP carries a first type of signal or channel and the second active BWP carries a second type of signal or channel. In some examples, the method may further include receiving scheduling information indicating communication of the first type of signal or channel, and selecting the first active BWP for the communication of the first type of signal or channel. In some examples, the first type of signal or channel has a higher priority than the second type of signal or channel. In some examples, the first active BWP is configured for a first sub-carrier spacing (SCS) and the second active BWP is configured for a second SCS different from the first SCS.

In some examples, the method may further include selecting the second active BWP, wherein the communicating with the base station using the first active BWP may include full duplex communication using the first active BWP and the second active BWP. In some examples, the full duplex communication using the first active BWP and the second active BWP may include concurrently transmitting first information to the base station via the first active BWP and receiving second information from the base station via the second active BWP.

FIG. 15 is a flow chart illustrating an example method 1500 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the method 1500 may be carried out by the UE 1300 illustrated in FIG. 13. In some examples, the method 1500 may be carried out by any suitable apparatus or means for carrying out the functions or algorithm described below.

At block 1502, a UE may receive bandwidth part (BWP) configuration information from a base station, the BWP configuration information specifying a first active BWP for the UE and a second active BWP for the UE. For example, the BWP configuration circuitry 1342 together with the communication and processing circuitry 1341 and the transceiver 1310, shown and described above in connection with FIG. 13, may receive and process a BWP configuration.

In some examples, the BWP configuration information may include a common BWP configuration for a plurality of UEs including the first UE. In some examples, receiving the BWP configuration information from the base station may include receiving the BWP configuration information via a radio resource control (RRC) message.

At block 1504, the UE may determine that the BWP configuration information specifying the first active BWP for the UE and the second active BWP for the UE is a violation of at least one BWP constraint for the UE. For example, the BWP management circuitry 1343, shown and described above in connection with FIG. 13, may compare a BWP configuration with the UE's capability information (e.g., bandwidth, frequency allocation, etc.).

In some examples, determining that the BWP configuration information specifying the first active BWP for the UE and the second active BWP for the UE is a violation of at least one BWP constraint for the UE is based on a BWP bandwidth constraint for the UE. In some examples, the BWP bandwidth constraint specifies that a sum of a first bandwidth of the first active BWP and a second bandwidth of the second active BWP is to be less than a threshold bandwidth.

In some examples, determining that the BWP configuration information specifying the first active BWP for the UE and the second active BWP for the UE is a violation of at least one BWP constraint for the UE is based on a BWP frequency allocation constraint for the UE. In some examples, the BWP frequency allocation constraint specifies a minimum guard band between the first active BWP and the second active BWP.

In some examples, determining that the BWP configuration information specifying the first active BWP for the UE and the second active BWP for the UE is a violation of at least one BWP constraint for the UE is based on at least one channel configuration for a BWP for the UE. In some examples, the at least one channel configuration for a BWP specifies that a first physical downlink control channel (PDCCH) configuration of the second active BWP is a function of a second PDCCH configuration of the first active BWP.

In some examples, determining that the BWP configuration information specifying the first active BWP for the UE and the second active BWP for the UE is a violation of at least one BWP constraint for the UE is based on a semi-persistent scheduling (SPS) constraint for a BWP for the UE.

In some examples, determining that the BWP configuration information specifying the first active BWP for the UE and the second active BWP for the UE is a violation of at least one BWP constraint for the UE may include categorizing the BWP configuration information specifying a first active BWP and a second active BWP as an error condition.

At block 1506, the UE may abstain from communicating via at least one of the first active BWP or the second active BWP as a result of the violation of the at least one BWP constraint for the UE. For example, the BWP management circuitry 1343, shown and described above in connection with FIG. 13, may designate the BWP configuration as an error condition.

In some examples, abstaining from communicating via at least one of the first active BWP or the second active BWP may include abstaining from communicating via either of the first active BWP or the second active BWP. In some examples, abstaining from communicating via at least one of the first active BWP or the second active BWP may include communicating via the first active BWP, and abstaining from communicating via the second active BWP.

In some examples, the method may further include comparing a first identifier of the first active BWP to a second identifier of the first active BWP, determining that the first identifier has a lower value than the second identifier, and selecting the first active BWP for communication based on the determining that the first identifier has a lower value than the second identifier.

Figure 16:
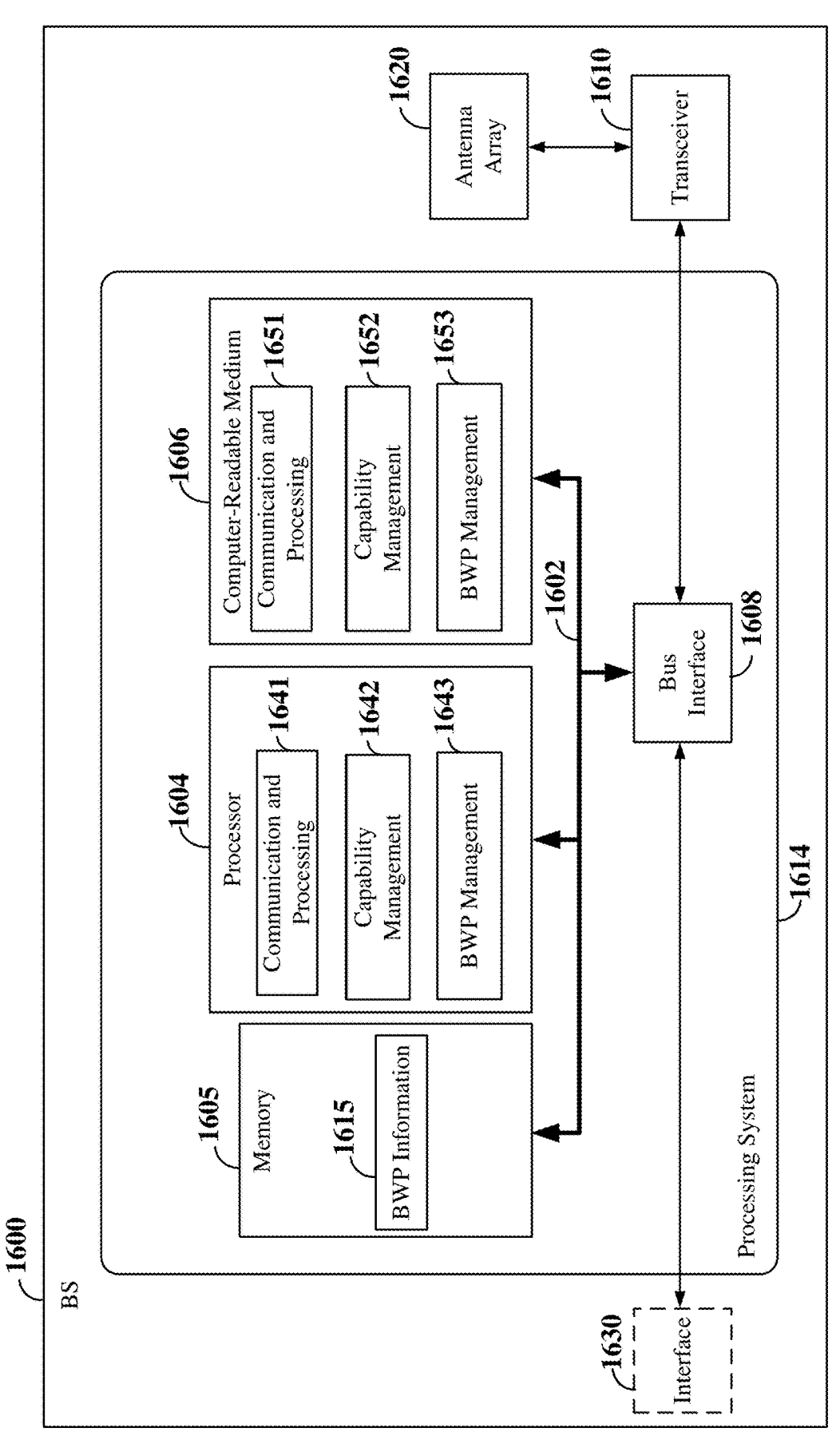
FIG. 16 is a block diagram illustrating an example of a hardware implementation for a base station employing a processing system according to some aspects.

FIG. 16 is a conceptual diagram illustrating an example of a hardware implementation for base station (BS) 1600 employing a processing system 1614. In some implementations, the BS 1600 may correspond to any of the BSs (e.g., gNBs,) or scheduling entities shown in FIGS. 1, 2, 3A, 3B, 3C, 7A, 7B, 11 and/or 12.

In accordance with various aspects of the disclosure, an element, or any portion of an element, or any combination of elements may be implemented with the processing system 1614. The processing system may include one or more processors 1604. The processing system 1614 may be substantially the same as the processing system 1314 illustrated in FIG. 13, including a bus interface 1608, a bus 1602, memory 1605, a processor 1604, and a computer-readable medium 1606. Furthermore, the BS 1600 may include an interface 1630 (e.g., a network interface) that provides a means for communicating with at least one other apparatus within a core network and with at least one radio access network.

The BS 1600 may be configured to perform any one or more of the operations described herein (e.g., as described above in conjunction with FIGS. 1-12 and as described below in conjunction with FIG. 17). In some aspects of the disclosure, the processor 1604, as utilized in the BS 1600, may include circuitry configured for various functions.

The processor 1604 may be configured to generate, schedule, and modify a resource assignment or grant of time-frequency resources (e.g., a set of one or more resource elements). For example, the processor 1604 may schedule time-frequency resources within a plurality of time division duplex (TDD) and/or frequency division duplex (FDD) subframes, slots, and/or mini-slots to carry user data traffic and/or control information to and/or from multiple UEs.

In some aspects of the disclosure, the processor 1604 may include communication and processing circuitry 1641. The communication and processing circuitry 1644 may be configured to communicate with a UE. The communication and processing circuitry 1641 may include one or more hardware components that provide the physical structure that performs various processes related to communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. The communication and processing circuitry 1641 may further be configured to execute communication and processing software 1651 included on the computer-readable medium 1606 to implement one or more functions described herein.

In some implementations where the communication involves receiving information, the communication and processing circuitry 1641 may obtain information from a component of the BS 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving.

In some implementations where the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for sending (e.g., means for transmitting).

The processor 1604 may include capability management circuitry 1642 configured to perform UE capability management-related operations as discussed herein. The capability management circuitry 1642 may include functionality for a means for receiving capability information. The capability management circuitry 1642 may further be configured to execute capability management software 1652 included on the computer-readable medium 1606 to implement one or more functions described herein.

The processor 1604 may include BWP management circuitry 1643 configured to perform BWP management-related operations as discussed herein. The BWP management circuitry 1643 may include functionality for a means for generating BWP configuration information. The BWP configuration circuitry 1342 may further be configured to receive BWP information 1615 from memory 1305, and may be further configured to execute BWP management software 1653 included on the computer-readable medium 1606 to implement one or more functions described herein.

Figure 17:
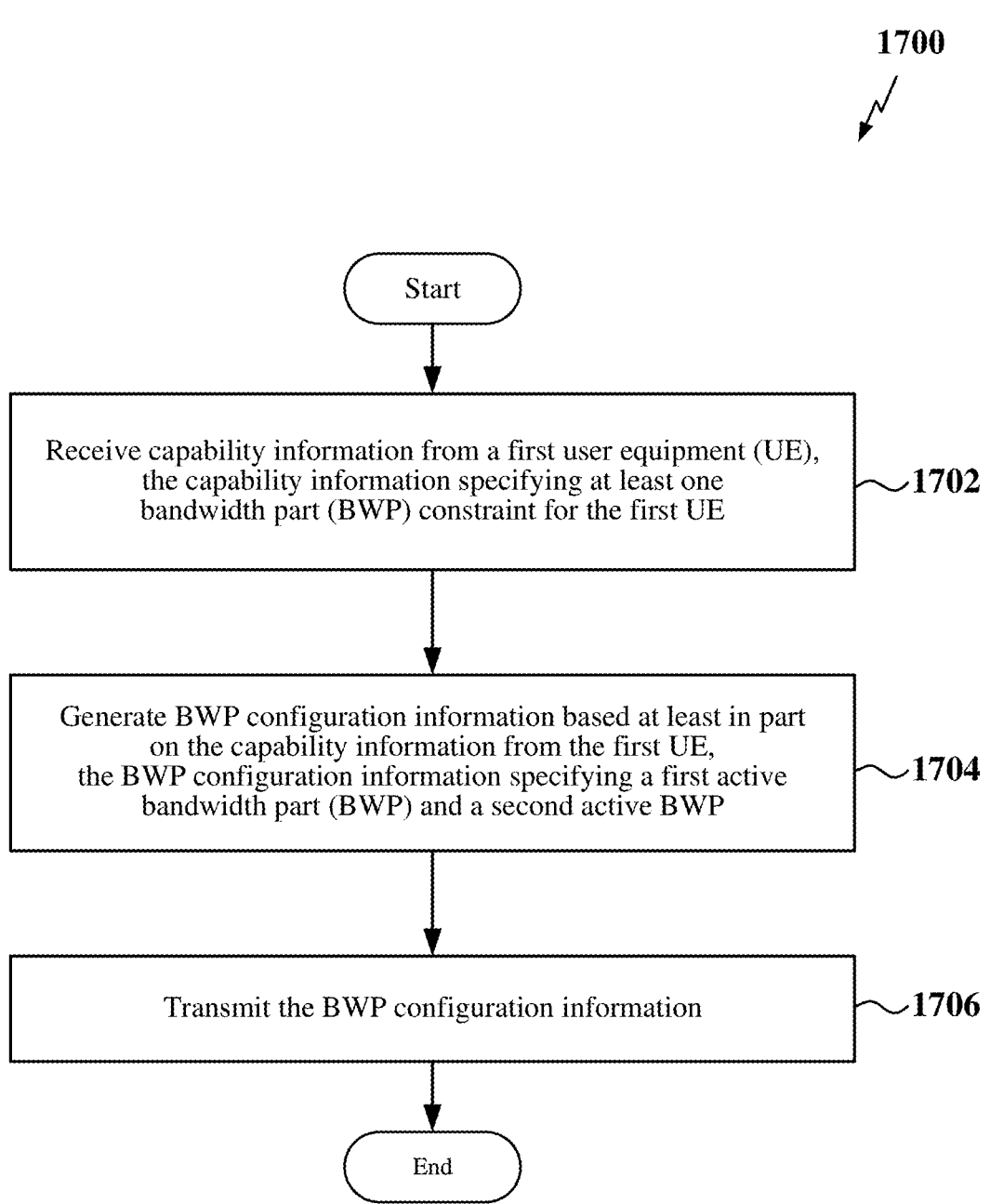
FIG. 17 is a flow chart of another example method for configuring multiple active BWPs according to some aspects.

FIG. 17 is a flow chart illustrating an example method 1700 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the method 1700 may be carried out by the BS 1600 illustrated in FIG. 16. In some examples, the method 1700 may be carried out by any suitable apparatus or means for carrying out the functions or algorithm described below.

At block 1702, a BS may receive capability information from a first user equipment (UE), the capability information specifying at least one bandwidth part (BWP) constraint for the first UE. For example, the capability management circuitry 1642 together with the communication and processing circuitry 1641 and the transceiver 1610, shown and described above in connection with FIG. 16, may receive and process capability information to identify at least one BWP constraint for at least one UE.

At block 1704, the BS may generate BWP configuration information based at least in part on the capability information from the first UE, the BWP configuration information specifying a first active BWP and a second active BWP. For example, the BWP management circuitry 1643, shown and described above in connection with FIG. 16, may generate the BWP configuration (e.g., based on resource usage in the system and/or resource usage requirements of particular UEs).

In some examples, the BWP configuration information may include a common BWP configuration for a plurality of UEs including the first UE.

At block 1706, the BS may transmit the BWP configuration information. For example, the BWP management circuitry 1643 together with the communication and processing circuitry 1641 and the transceiver 1610, shown and described above in connection with FIG. 16, may unicast or broadcast the BWP configuration.

In some examples, the method may further include determining whether the first UE will communicate in the first active BWP, and selectively communicating with the first UE in at least one of the first active BWP or the second active BWP based on whether the first UE will communicate in the first active BWP. In some examples, determining whether the first UE will communicate in the first active BWP is based on at least one of the at least one BWP constraint for the first UE, a configuration of the first UE that specifies a main active BWP and a secondary active BWP, a first identifier of the first active BWP, a configuration of the first UE that specifies an active BWP to be monitored, a configuration of the first UE that specifies an active BWP for monitoring a physical downlink control channel (PDCCH), a configuration of the first UE that specifies first signaling carried by the first active BWP, a transition between a half-duplex (HD) slot and a full duplex (FD) slot, a transition from a first type of FD slot and second type of FD slot, or any combination thereof.

In some examples, the at least one BWP constraint for the first UE specifies at least one of a BWP bandwidth constraint, a BWP frequency allocation constraint, at least one channel configuration for a BWP, a semi-persistent scheduling constraint for a BWP, or any combination thereof. In some examples, the first identifier of the first active BWP has a lower value than a second identifier of the second active BWP. In some examples, the first signaling carried by the first active BWP has a higher priority than second signaling carried by the second active BWP. In some examples, the first type of FD slot carries first uplink traffic with a first bandwidth, and the second type of FD slot carries second uplink traffic with a second bandwidth that is wider than the first bandwidth.

In some examples, determining whether the first UE will communicate in the first active BWP may include determining that the first UE will communicate in the first active BWP, and selectively communicating with the first UE in at least one of the first active BWP or the second active BWP based on whether the first UE will communicate in the first active BWP may include transmitting downlink information to the first UE via the first active BWP or receiving uplink information from the first UE via the first active BWP after determining that the first UE will communicate in the first active BWP.

In some examples, determining whether the first UE will communicate in the first active BWP may include determining that the first UE will not communicate in the first active BWP, and selectively communicating with the first UE in at least one of the first active BWP or the second active BWP based on whether the first UE will communicate in the first active BWP may include transmitting downlink information to the first UE via the second active BWP or receiving uplink information from the first UE via the second active BWP after determining that the first UE will not communicate in the first active BWP.

In some examples, the method may further include transmitting configuration information specifying that the first active BWP is a main active BWP and the second active BWP is a secondary active BWP. In some examples, the method may further include transmitting configuration information specifying that the first UE is to monitor physical channels and physical signals in both the first active BWP and the second active BWP. In some examples, the method may further include transmitting configuration information specifying that the first UE is to monitor a physical downlink control channel (PDCCH) in the first active BWP, and communicate physical downlink shared channel (PDSCH) information in both the first active BWP and the second active BWP. In some examples, the method may further include transmitting configuration information specifying that the first UE is to monitor physical channels and physical signals in the first active BWP until the first UE is signaled to monitor a different active BWP. In some examples, the method may further include transmitting configuration information specifying that the first UE is to monitor physical channels and physical signals in the first active BWP until the first UE elects to monitor a different active BWP.

In some examples, the method may further include transmitting configuration information specifying that the first active BWP carries a first type of signal or channel and the second active BWP carries a second type of signal or channel. In some examples, the method may further include transmitting scheduling information indicating communication of the first type of signal or channel. In some examples, the first type of signal or channel has a higher priority than the second type of signal or channel. In some examples, the first active BWP is configured for a first sub-carrier spacing (SCS) and the second active BWP is configured for a second SCS different from the first SCS.

In some examples, the method may further include determining that the first UE will not communicate in either of the first active BWP or the second active BWP, and transmitting additional BWP configuration information to the first UE after determining that the first UE will not communicate in either of the first active BWP or the second active BWP. In some examples, determining that the first UE will not communicate in either of the first active BWP or the second active BWP may include determining that the first UE will categorize the BWP configuration information specifying a first active BWP and a second active BWP as an error condition. In some examples, determining that the first UE will not communicate in either of the first active BWP or the second active BWP is based on at least one of a BWP bandwidth constraint, a BWP frequency allocation constraint, at least one channel configuration for a BWP, a semi-persistent scheduling constraint for a BWP, or any combination thereof.

Figure 18:
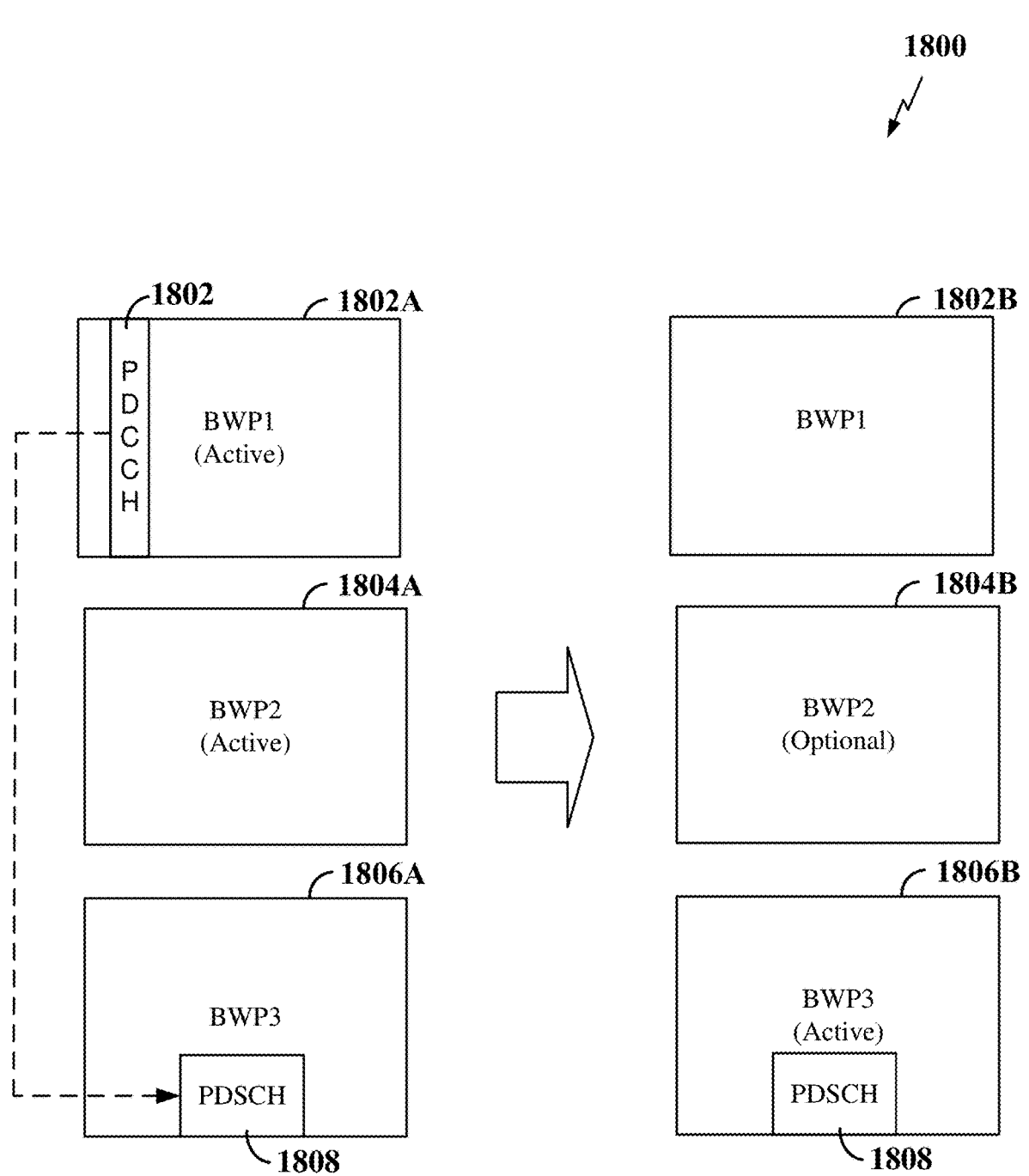
FIG. 18 illustrates cross-BWP scheduling and switching of BWPs using control information that is received in the UE in accordance with some aspects of the present disclosure.

FIG. 18 illustrates cross-BWP scheduling and switching of BWPs 1800 using control information (e.g., DCI) that is received in the UE in accordance with some aspects of the present disclosure. The cross-BWP scheduling and switching may utilize any of BWP configuration circuitry and/or BWP management circuitry 1343, discussed above. The example shows three BWPs (1802A, 1804A, 1806A) in which BWP1 1802A and BWP2 (1804A) are active. Similar to the example of FIG. 9, a UE may be configured to monitor PDCCH 1802 in one BWP and operate in one or both BWPs (e.g., receive PDSCH in one or both active BWPs based on scheduling carried by the PDCCH). For example, as shown in the cross-BWP scheduling 1800 of FIG. 18, a PDCCH 1802 carried by a first active BWP1 1802A may indicate that a PDSCH 1808 is scheduled in another BWP3 1806A. At the same time, BWP2 is active as well. A decision as to which active BWP the UE is to monitor may be made in different ways. In some examples, the BWP configuration may include an indication (e.g., one bit) that specifies in which BWP the UE is monitor for PDCCH. In some examples, the UE monitors the PDCCH only in the main BWP.

In one example, when the UE engages in cross-BPW switching (designated by the arrow in the figure), the UE switches BWP3 1806A to active BWP3 1806B, as designated by the PDCCH 1802 and receives the PDSCH 1808. Also, during the cross-BWP switching, active BWP2 1804A may be optionally reconfigured, depending on the UE configuration. In one example, if the UE capability information (e.g., at least one BWP constraint for the UE), determines that BPW2 1804B may be active concurrently with an active BWP3 1806B, BWP2 1804B is kept active after the cross-BWP switch. If the UE capability information determines that BPW2 1804B may not be active concurrently with an active BWP3 1806B, BWP2 1804B is deactivated after the cross-BWP switch. UE capability information may be communicated with a base station (e.g., 1600) using capability management circuitry 162, and control information may be received from the base station using BWP management circuitry 1643.

Figure 19:
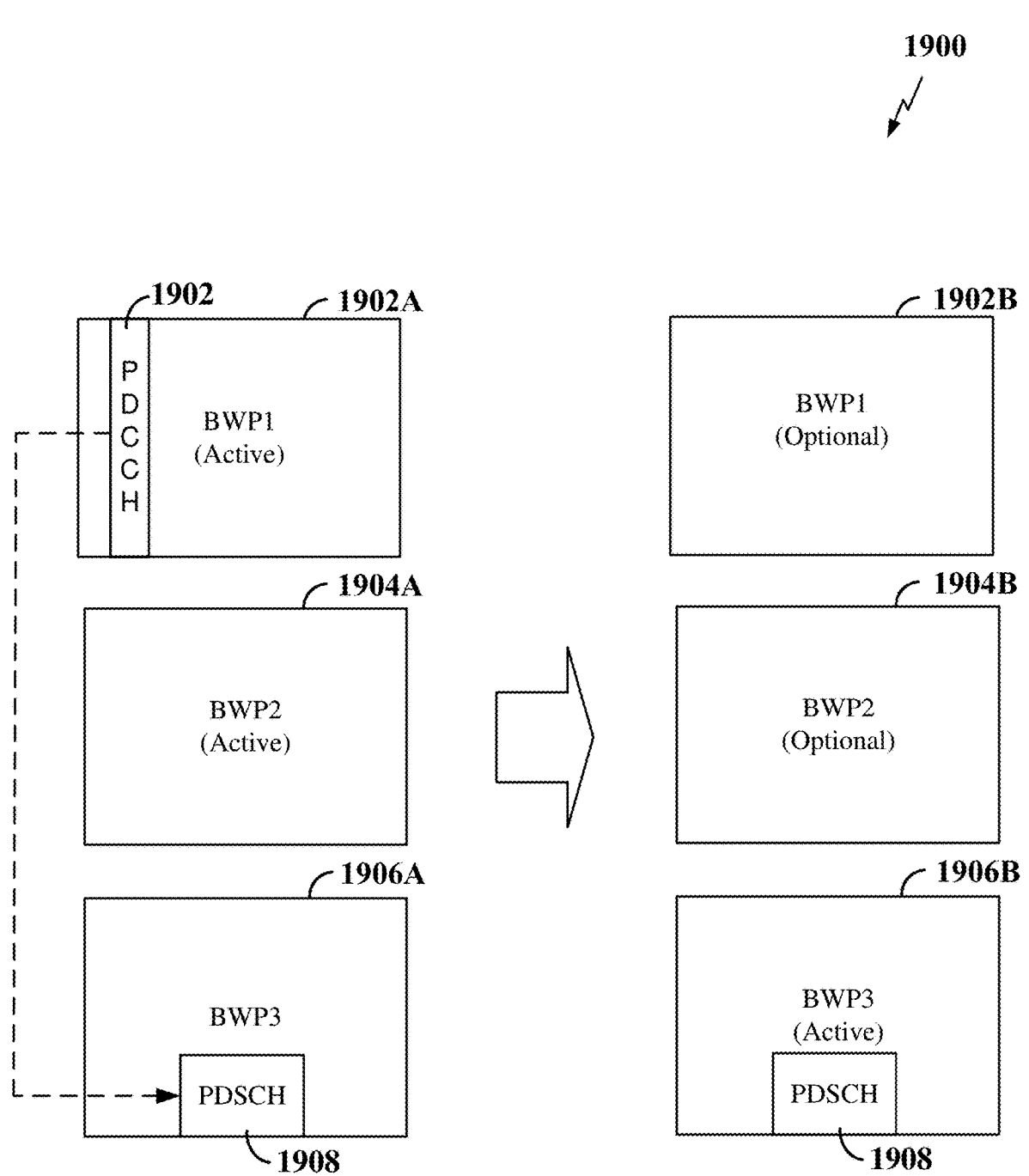
FIG. 19 illustrates another example of cross-BWP scheduling and switching of BWPs using control information that is received in the UE in accordance with some aspects of the present disclosure.

FIG. 19 illustrates another example of cross-BWP scheduling and switching of BWPs 1900 using control information (e.g., DCI) that is received in the UE in accordance with some aspects of the present disclosure. The example shows three BWPs (1902A, 1904A, 1906A) in which BWP1 1902A and BWP2 (1904A) are active. Similar to the example of FIG. 18, the UE may be configured to monitor PDCCH 1902 in one BWP and operate in one or both BWPs (e.g., receive PDSCH in one or both active BWPs based on scheduling carried by the PDCCH). For example, as shown in the cross-BWP scheduling 1900 of FIG. 18, a PDCCH 1902 carried by a first active BWP1 1902A may indicate that a PDSCH 1908 is scheduled in a another BWP3 1906A. At the same time, BWP2 is active as well. A decision as to which active BWP the UE is to monitor may be made in different ways.

In one example, when the UE engages in cross-BPW switching (designated by the arrow in the figure), the UE switches BWP3 1906A to active BWP3 1809B, as designated by the PDCCH 1902 and receives the PDSCH 1908. Also, during the cross-BWP switching, active BWP1 1902A and BWP2 1904A may be optionally reconfigured, depending on the UE configuration. In one example, if the UE capability information (e.g., at least one BWP constraint for the UE), determines that BPW2 1904B may be active concurrently with an active BWP3 1906B, BWP2 1904B is kept active after the cross-BWP switch. If the UE capability information determines that BPW2 1804B may not be active concurrently with an active BWP3 1806B, BWP2 1804B is deactivated after the cross-BWP switch.

In one example, UE capability information may also be used on other BWPs, such as BWP1 1902A during cross-BPW switching. In one example, when cross-BWP switching occurs, the UE may be configured to determine if UE capability information allows for BWP1 1902A to remain active concurrently with BWP3 1906A. If the UE capability information determines that BWP1 1902A can remain active concurrently with BWP3 1906A, BWP1 1902B will be activated concurrently with BWP3 1906B after the cross-BPW switching is completed. In some examples, the UE may determine from the UE capability information if BWP1 1902A or BWP2 1904A is better suited for concurrent activation with BWP3 1906, and, depending on the determination, either BWP1 1902B or BWP2 1904B will be activated concurrently with BWP3 1906B after cross-BWP switching in completed. In some examples, the UE may be configured to first determine if BWP1 1902A satisfies requirements of the UE capability information. If BWP1 1902A does not satisfy requirements of the UE capability information, then the same determination is made for BWP2 1904A. In some examples, the reverse determination may be made as well (i.e., determine BWP2 1904A first, then BWP1 1902A).

Figure 20:
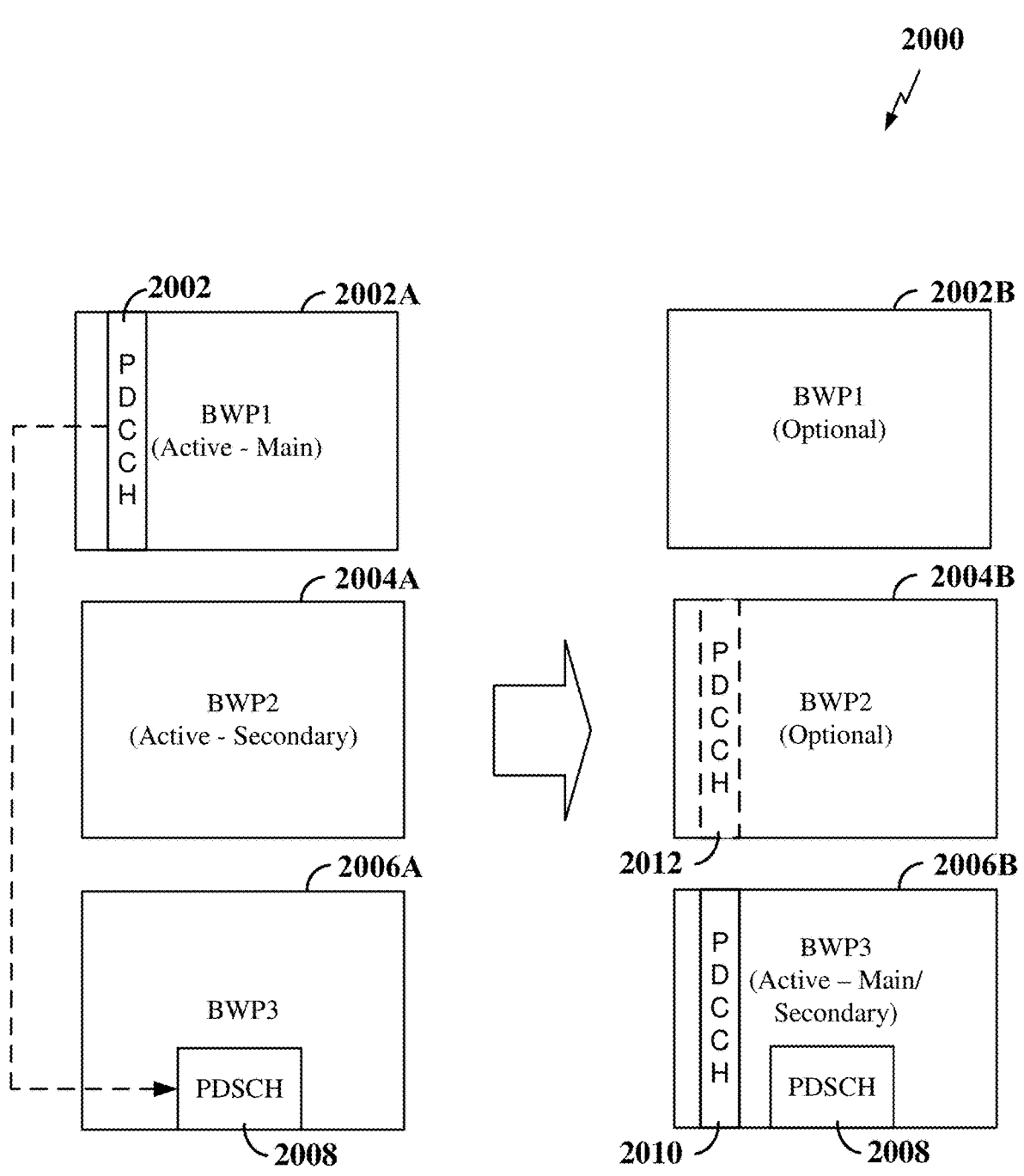
FIG. 20 illustrates an example of cross-BWP scheduling and switching of BWPs of a main and secondary BWP using control information that is received in the UE in accordance with some aspects of the present disclosure.

FIG. 20 illustrates an example of cross-BWP scheduling and switching of BWPs 2000 of a main and secondary BWP using control information (e.g., DCI) that is received in the UE in accordance with some aspects of the present disclosure. In this example, three BWPs are shown as BWP1 2002A, BWP2 2004A and BWP3 2006A, where BWP1 2002A is configured as an active main BWP, and BWP2 2004A is configured as an active secondary BWP. During operation, BWP1 2002A may be configured to monitor PDCCH 2002 that may indicate that a PDSCH 2008 is scheduled in BWP3 2006A.

In one example, during cross-BWP switching (indicated by the arrow), the UE may reconfigure BWP3 2006B to be a new main active BWP and further reconfigure BWP3 2006B to monitor PDCCH 2010. In another example, the UE may reconfigure secondary active BWP2 2004A to be a main active BWP2 2004B, while BWP3 2006B is reconfigured to be active secondary BWP. In this example, BWP2 2004A may also be reconfigured to monitor PDCCH 2012.

In another example, during cross-BWP switching, the UE may reconfigure BWP3 2006B to be a new main active BWP and further reconfigure BWP1 2002A to remain active as an active secondary BWP1 2002B. Similarly, the UE may reconfigure BWP1 2002A to keep it as an active main BWP1 2002B, and switch BWP3 2006A to become an active secondary BWP3 2006B. In these cases, the UE may also deactivate BWP2 2004B when activating BWP1 2002B and BWP3 2006B. Furthermore, the UE may also use either of BWP1 2002B and/or BWP3 2006B for PDCCH monitoring.

In some examples, the UE may be configured to monitor PDCCH in two active BWPs (e.g., BWP2 2004B, BWP3 2006B). In some examples, the UE may receive control information (e.g., DCI) in each of the active BWPs indicating a switch to another BWP (e.g., BWP1, BWP4 (not shown in the figure)). If the control information in each of the active BWPs is pointing to the same new BWP (e.g., BWP1 2002B), the UE may activate the new BWP during cross-switching and deactivate the two previously-active BWPs. Alternately or in addition, the UE may keep one of the previously-active BWPs (e.g., BWP2 2004B, BWP3 2006B) and activate the new BWP. The UE determination as to which BWP is kept may be dependent on the UE capability information, where the UE may keep the one previously-active BWPs that best conforms with UE capabilities while being active together with the new BWP. Alternately or in addition, the UE determination as to which BWP is kept may be dependent on BWP identification (ID), where, for example, the BWP having the smaller BWP ID is kept active after the cross-switching is completed. In another example, if both of the previously-active BWPs are determined to be within the UE capability, the UE may be configured to keep the BWP having the smaller (or larger) BWP ID active after BWP cross-switching is completed.

In one example, if the UE is configured to monitor PDCCH in two active BWPs (e.g., BWP2 2004B, BWP3 2006B) and receives control information in each of the active BWPs is pointing to different new BWPs (e.g., BWP1 2002B, BWP4 (not shown)), the UE may activate the new BWPs during cross-switching and deactivate the previously-active BWPs (e.g., BWP2, BWP3). If a UE is configured with only one BWP and receives control information indicating another BWP, the UE may keep both BWPs active as long as they are within UE capability parameters as set forth in the UE capability information.

FIG. 21 is a flow chart of an example method 2100 for BPW cross-switching according to some aspects. As described below, some or all illustrated features may be omitted in a particular implementation within the scope of the present disclosure, and some illustrated features may not be required for implementation of all examples. In some examples, the method 2100 may be carried out by a scheduled entity (e.g., UE 1300). In some examples, the method 2100 may be carried out by any suitable apparatus or means for carrying out the functions or algorithms described below.

In block 2102 the UE may communicate with a base station using a first bandwidth part (BWP) as a main active BWP (e.g., 1802A, 1902A, 2002A) and a second BWP (e.g., 1804A, 1904A, 2004A). For example, the communications and processing circuitry 1341 and BWP configuration circuitry 1342 shown and described in connection with FIG. 13 may provide a means for communicating with a base station.

In block 2104 the UE may receive BWP configuration information (e.g., DCI) from a base station (e.g., 1600), the BWP configuration information specifying a third active BWP (e.g., 1806A, 1906A, 2006A) for the UE. For example, the communications and processing circuitry 1341 and BWP configuration circuitry 1342 shown and described in connection with FIG. 13 may provide a means for receiving BWP configuration information. The UE may then communicate with the base station on a new main active BWP (e.g., 1806B, 1906B, 2006B) selected from the first BWP, the second BWP, and the third BW in block 2106. For example, the BWP configuration circuitry 1342 and BWP management circuitry 1343 shown and described in connection with FIG. 13 may provide a means for reconfiguring the BWPs to activate a new main active BWP.

In some examples, the UE may access UE capability information, and the reconfiguration of the BWPs may include one of activating the third active BWP as the new main active BWP, deactivating the first BWP and, depending on the accessed UE capability information, reconfiguring the second BWP as a new secondary active BWP, or deactivating the second BWP, or activating the third active BWP as the new main active BWP, deactivating the second BWP and, depending on the accessed UE capability information, reconfiguring the first BWP as a new secondary active BWP, or deactivating the first BWP.

In some examples, the method may further include The UE monitoring a physical downlink control channel (PDCCH) in the first BWP, and receiving physical downlink shared channel (PDSCH) information in the received BWP configuration information from the base station specifying the third active BWP. In some examples, the reconfiguring the BWPs to activate the new main active BWP may include one of: activating the third active BWP as the new main active BWP, and monitoring the PDCCH in the third active BWP, activating the second BWP as the new main active BWP, and monitoring the PDCCH in the second BWP, activating the first BWP as the new main active BWP, deactivating the second BWP, and activating the third BWP as a new secondary active BWP, or activating the third BWP as the new main active BWP, deactivating the second BWP, activating the first BWP as a new secondary active BWP.

In some examples, the method may further include the UE monitoring a physical downlink control channel (PDCCH) in the first BWP and the second BWP, wherein receiving BWP configuration information includes receiving BWP configuration information in both the first BWP and the second BWP. In some examples, reconfiguring the BWPs to activate the new main active BWP includes activating the third BWP and deactivating both the first BWP and the second BWP. In some examples, reconfiguring the BWPs to activate the new main active BWP includes activating the third BWP and deactivating one of the first BWP or the second BWP. In some examples, deactivating one of the first BWP or second BWP includes deactivating one of the first BWP or the second BWP based on the accessed UE capability information. In some examples, deactivating one of the first BWP or second BWP includes deactivating one of the first BWP or the second BWP based on BWP identification.

In some examples receiving the BWP configuration information in both the first BWP and the second BWP includes receiving configuration information specifying the third active BWP and a fourth active BWP for the UE. Reconfiguring the BWPs to activate the new main active BWP may include activating the third active BWP and the fourth active BWP and deactivating the first BWP and the second BWP.

FIG. 22 is a flow chart of an example method 2200 for base station communications for BPW cross-switching according to some aspects. As described below, some or all illustrated features may be omitted in a particular implementation within the scope of the present disclosure, and some illustrated features may not be required for implementation of all examples. In some examples, the method 2200 may be carried out by a scheduling entity (e.g., BS 1600). In some examples, the method 2200 may be carried out by any suitable apparatus or means for carrying out the functions or algorithms described below.

In block 2202, the base station may receive capability information from a first user equipment (UE), the capability information specifying at least one bandwidth part (BWP) constraint for the first UE relating to a first active BWP comprising a main active BWP (e.g., 1802A, 1902A, 2002A), and a second BWP (e.g., 1802A, 1902A, 2002A) comprising a secondary active BWP. For example, the communication and processing circuitry 1641 and capability management circuitry 1642 shown and described in connection with FIG. 16 may provide a means for receiving capability information from a first user equipment.

In block 2204, the base station may transmit BWP configuration information based at least in part on the capability information from the UE, the BWP configuration information specifying a third active BWP (e.g., 1806A, 1906A, 2006A) to activate a new main active BWP (e.g., 1806B, 1906B, 2006B) from the first BWP, the second BWP, and the third BWP. In block 2206, the base station may transmit the BWP configuration information to the UE. For example, the BWP management circuitry 1643 shown and described in connection with FIG. 16 may provide a means for generating BWP configuration information, and communication and processing circuitry 1641 may provide a means for transmitting the BWP configuration information.

In some examples, the BS may transmit the BWP configuration information by transmitting via physical downlink shared channel (PDSCH) information for at least one of the first BWP, the second BWP, and the third BWP in the BWP configuration information. In some examples, receiving the BWP configuration information may include specifying a fourth active BWP for reconfiguring the first BWP, the second BWP, the third BWP, and the fourth BWP to activate a new main active BWP.

The following provides an overview of examples of the present disclosure.

Example 1: A user equipment, comprising: a transceiver; a memory; and a processor communicatively coupled to the transceiver and the memory, wherein the processor and the memory are configured to: communicate with a base station using a first bandwidth part (BWP) as a main active BWP and a second BWP as a secondary active BWP; receive BWP configuration information from a base station, the BWP configuration information specifying a third active BWP for the UE; and communicate with the base station on a new main active BWP selected from the first BWP, the second BWP, and the third BWP.

Example 2: The user equipment of example 1, wherein the processor and the memory are configured to access UE capability information.

Example 3: The user equipment of example 1 and/or 2, wherein the processor and the memory are configured to reconfigure the BWPs by one of: communicate with the base station on the third active BWP as the new main active BWP, deactivate the first BWP, and either reconfiguring the second BWP as a new secondary active BWP or deactivating the second BWP based on the UE capability information, or communicate with the base station on the third active BWP as the new main active BWP, deactivate the second BWP, and either reconfigure the first BWP as a new secondary active BWP or deactivating the first BWP based on the UE capability information.

Example 4: The user equipment of any of examples 1 through 3, wherein the processor and the memory are further configured to: monitor a physical downlink control channel (PDCCH) in the first BWP; and receive a physical downlink shared channel (PDSCH) comprising the received BWP configuration information from the base station specifying the third active BWP.

Example 5: The user equipment of any of examples 1 through 4, wherein the processor and the memory are configured to activate the new main active BWP by one of: activating the third active BWP as the new main active BWP, and monitoring the PDCCH in the third active BWP, activating the second BWP as the new main active BWP, and monitoring the PDCCH in the second BWP, activating the first BWP as the new main active BWP, deactivating the second BWP, and activating the third BWP as a new secondary active BWP, or activating the third BWP as the new main active BWP, deactivating the second BWP, activating the first BWP as a new secondary active BWP.

Example 6: The user equipment of any of examples 1 through 5, wherein the processor and the memory are configured to monitor a physical downlink control channel (PDCCH) in the first BWP and the second BWP and to receive the BWP configuration information in both the first BWP and the second BWP.

Example 7: The user equipment of any of examples 1 through 6, wherein the processor and the memory are configured to activate the new main active BWP by activating the third BWP and deactivating both the first BWP and the second BWP.

Example 8: The user equipment of any of examples 1 through 7, wherein the processor and the memory are configured to activate the new main active BWP by activating the third BWP and deactivating one of the first BWP or the second BWP.

Example 9: The user equipment of any of examples 1 through 8, wherein the processor and the memory are configured to deactivate one of the first BWP or second BWP by deactivating one of the first BWP or the second BWP based on UE capability information.

Example 10: The user equipment of any of examples 1 through 9, wherein the processor and the memory are configured to deactivate one of the first BWP or second BWP by deactivating one of the first BWP or the second BWP based on BWP identification numbers of the first BWP or second BWP.

Example 11: The user equipment of any of examples 1 through 10, wherein the processor and the memory are configured to receive the BWP configuration information in both the first BWP and the second BWP by receiving additional BWP configuration information specifying the third active BWP and a fourth active BWP for the UE.

Example 12: The user equipment of any of examples 1 through 11, wherein the processor and the memory are configured to activate the new main active BWP by activating the third active BWP and the fourth active BWP and deactivating the first BWP and the second BWP.

Example 13: A method of wireless communication at a user equipment (UE), the method comprising: communicating with a base station using a first bandwidth part (BWP) as a main active BWP and a second BWP as a secondary active BWP; receiving BWP configuration information from a base station, the BWP configuration information specifying a third active BWP for the UE; and communicating with the base station on a new main active BWP selected from the first BWP, the second BWP, and the third BWP.

Example 14: The method of example 13, further comprising accessing UE capability information.

Example 15: The method of examples 13 and/or 14, further comprising: activating the third active BWP as the new main active BWP, deactivating the first BWP, and either reconfiguring the second BWP as a new secondary active BWP or deactivating the second BWP based on the UE capability information, or activating the third active BWP as the new main active BWP, deactivating the second BWP, and either reconfiguring the first BWP as a new secondary active BWP or deactivating the first BWP based on the UE capability information.

Example 16: The method of any of examples 13 through 15, further comprising monitoring a physical downlink control channel (PDCCH) in the first BWP; and receiving a physical downlink shared channel (PDSCH) comprising the received BWP configuration information from the base station specifying the third active BWP.

Example 17: The method of any of examples 13 through 16, further comprising one of: activating the third active BWP as the new main active BWP, and monitoring the PDCCH in the third active BWP, activating the second BWP as the new main active BWP, and monitoring the PDCCH in the second BWP, activating the first BWP as the new main active BWP, deactivating the second BWP, and activating the third BWP as a new secondary active BWP, or activating the third BWP as the new main active BWP, deactivating the second BWP, activating the first BWP as a new secondary active BWP.

Example 18: The method of any of examples 13 through 17, further comprising monitoring a physical downlink control channel (PDCCH) in the first BWP and the second BWP, wherein the receiving the third BWP configuration information comprises receiving the third BWP configuration information in both the first BWP and the second BWP.

Example 19: The method of any of examples 13 through 18, further comprising: activating the third BWP and deactivating both the first BWP and the second BWP.

Example 20: The method of any of examples 13 through 19, further comprising: activating the third BWP and deactivating one of the first BWP or the second BWP.

Example 21: The method of any of examples 13 through 20, wherein the deactivating one of the first BWP or second BWP comprises deactivating one of the first BWP or the second BWP based on UE capability information.

Example 22: The method of any of examples 13 through 21, wherein the deactivating one of the first BWP or second BWP comprises deactivating one of the first BWP or the second BWP based on BWP identification numbers of the first BWP or second BWP.

Example 23: The method of any of examples 13 through 22, wherein the receiving the BWP configuration information in both the first BWP and the second BWP comprises receiving additional BWP configuration information specifying the third active BWP and a fourth active BWP for the UE.

Example 24: The method of any of examples 13 through 23, further comprising: activating the third active BWP and the fourth active BWP and deactivating the first BWP and the second BWP.

Example 25: A base station, comprising: a transceiver; a memory; and a processor communicatively coupled to the transceiver and the memory, wherein the processor and the memory are configured to: receive capability information from a first user equipment (UE), the capability information specifying at least one bandwidth part (BWP) constraint for the first UE relating to a first active BWP comprising a main active BWP, and a second BWP comprising a secondary active BWP; and transmit BWP configuration information based at least in part on the capability information from the UE, the BWP configuration information specifying a third active BWP to activate a new main active BWP from the first BWP, the second BWP, and the third BWP.

Example 26: The base station of example 25, wherein the processor and the memory are configured to transmit the BWP configuration information by transmitting via a physical downlink shared channel (PDSCH) comprising the BWP configuration information.

Example 27: The base station of examples 25 and/or 26, wherein the processor and the memory are configured to transmit additional BWP configuration information specifying a fourth active BWP to activate a new main active BWP from the first BWP, the second BWP, the third BWP, and the fourth BWP.

Example 28: A method of wireless communication at a base station, the method comprising: receiving capability information from a first user equipment (UE), the capability information specifying at least one bandwidth part (BWP) constraint for the first UE relating to a first active BWP comprising a main active BWP, and a second BWP comprising a secondary active BWP; receiving BWP configuration information based at least in part on the capability information from the UE, the BWP configuration information specifying a third active BWP for reconfiguring the first BWP, the second BWP, and the third BWP to activate a new main active BWP; and transmitting the BWP configuration information.

Example 29: The method of example 28, wherein transmitting the BWP configuration information comprises transmitting via a physical downlink shared channel (PDSCH) comprising the BWP configuration information.

Example 30: The base station of example 28 and/or 29, wherein transmitting additional BWP configuration information comprises specifying a fourth active BWP to activate a new main active BWP from the first BWP, the second BWP, the third BWP, and the fourth BWP.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any one or more of FIG. 1, 2, 3A, 3B, 3C, 7A, 7B, 11, 12, 13, or 16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A user equipment (UE), comprising:
one or more memories; and
one or more processors coupled to the one or more memories, wherein the one or more processors are configured to cause the UE to:
communicate with a Radio Access Network (RAN) node using a first bandwidth part (BWP) as a main active BWP and a second BWP as a secondary active BWP;
receive BWP configuration information from the RAN node via a physical downlink shared channel (PDSCH) comprising the BWP configuration information, the BWP configuration information specifying a third active BWP for the UE;
activate a new main active BWP by one of:
activation of the third active BWP as the new main active BWP, and monitoring the PDCCH in the third active BWP,
activation of the second BWP as the new main active BWP, and monitoring the PDCCH in the second BWP,
activation of the first BWP as the new main active BWP, deactivation of the second BWP, and activation of the third BWP as a new secondary active BWP, or
activation of the third active BWP as the new main active BWP, deactivation of the second BWP, and activation of the first BWP as a new secondary active BWP; and
communicate with the RAN node on the new main active BWP selected from the first BWP, the second BWP, and the third BWP.

2. The user equipment of claim 1, wherein the one or more processors are further configured to cause the UE to access UE capability information.

3. The user equipment of claim 1, wherein the one or more processors are further configured to cause the UE to activate the new main active BWP by activating the third BWP and deactivating both the first BWP and the second BWP.

4. The user equipment of claim 1, wherein the one or more processors are further configured to cause the UE to activate the new main active BWP by activating the third BWP and deactivating one of the first BWP or the second BWP.

5. The user equipment of claim 4, wherein the one or more processors are further configured to cause the UE to deactivate one of the first BWP or second BWP by deactivating one of the first BWP or the second BWP based on UE capability information.

6. The user equipment of claim 4, wherein the one or more processors are further configured to cause the UE to deactivate one of the first BWP or second BWP by deactivating one of the first BWP or the second BWP based on BWP identification numbers of the first BWP or second BWP.

7. The user equipment of claim 1, the one or more processors are further configured to cause the UE to receive the BWP configuration information in both the first BWP and the second BWP by receiving additional BWP configuration information specifying the third active BWP and a fourth active BWP for the UE.

8. The user equipment of claim 7, wherein the one or more processors are further configured to cause the UE to activate the new main active BWP by activating the third active BWP and the fourth active BWP and deactivating the first BWP and the second BWP.

9. A method of wireless communication at a user equipment (UE), the method comprising:

communicating with a Radio Access Network (RAN) node using a first bandwidth part (BWP) as a main active BWP and a second BWP as a secondary active BWP;

receiving BWP configuration information from the RAN node via a physical downlink shared channel (PDSCH) comprising the BWP configuration information, the BWP configuration information specifying a third active BWP for the UE;

activating a new main active BWP by one of:

activating the third active BWP as the new main active BWP, and monitoring the PDCCH in the third active BWP, activating the second BWP as the new main active BWP, and monitoring the PDCCH in the second BWP, activating the first BWP as the new main active BWP, deactivating the second BWP, and activating the third BWP as a new secondary active BWP, or activating the third BWP as the new main active BWP, deactivating the second BWP, and activating the first BWP as a new secondary active BWP; and communicating with the RAN node on a new main active BWP selected from the first BWP, the second BWP, and the third BWP.

10. The method of claim 9, further comprising accessing UE capability information.

11. The method of claim 9, further comprising:

activating the third BWP and deactivating both the first BWP and the second BWP.

12. The method of claim 9, further comprising:

activating the third BWP and deactivating one of the first BWP or the second BWP.

13. The method of claim 12, wherein the deactivating one of the first BWP or second BWP comprises deactivating one of the first BWP or the second BWP based on UE capability information.

14. The method of claim 12, wherein the deactivating one of the first BWP or second BWP comprises deactivating one of the first BWP or the second BWP based on BWP identification numbers of the first BWP or second BWP.

15. The method of claim 9, wherein the receiving the BWP configuration information in both the first BWP and the second BWP comprises receiving additional BWP configuration information specifying the third active BWP and a fourth active BWP for the UE.

16. The method of claim 15, further comprising:

activating the third active BWP and the fourth active BWP and deactivating the first BWP and the second BWP.

\* \* \* \* \*